US012048667B2

(12) United States Patent
Tung et al.

(10) Patent No.: US 12,048,667 B2
(45) **Date of Patent: *Jul. 30, 2024**

(54) USE OF A LEG SUPPORT EXOSKELETON

(71) Applicants: suitX, Inc., Emeryville, CA (US); The Regents of the University of California, Oakland, CA (US)

(72) Inventors: Wayne Tung, Berkeley, CA (US); Minerva Pillai, Redwood City, CA (US); Homayoon Kazerooni, Berkeley, CA (US)

(73) Assignees: The Regents of the University of California, Oakland, CA (US); suitX, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,326

(22) Filed: Dec. 29, 2021

(65) Prior Publication Data

US 2022/0117827 A1 Apr. 21, 2022

Related U.S. Application Data

(63) Continuation of application No. 15/972,419, filed on May 7, 2018, now Pat. No. 11,241,355, which is a (Continued)

(51) Int. Cl.
*A61H 3/00* (2006.01)
*A61H 1/02* (2006.01)

(52) U.S. Cl.
CPC ............... *A61H 3/00* (2013.01); *A61H 1/024* (2013.01); *A61H 2201/1207* (2013.01); *A61H 2201/1246* (2013.01); *A61H 2201/164* (2013.01); *A61H 2201/1642* (2013.01); *A61H 2201/165* (2013.01); *A61H 2201/1652* (2013.01);

(Continued)

(58) Field of Classification Search
CPC .......... A61F 5/0111; A61H 2201/1676; A61H 2201/1652; A61H 2201/165; A61H 2201/1642; A61H 2201/164; A61H 2201/1246; A61H 2201/1207; A61H 1/024; A61H 3/00
See application file for complete search history.

(56) References Cited

U.S. PATENT DOCUMENTS

| | | | | |
|---|---|---|---|---|
| 9,744,093 | B2 * | 8/2017 | Tung | A61H 1/024 |
| 9,980,873 | B2 * | 5/2018 | Tung | A61H 3/00 |
| 11,241,355 | B2 * | 2/2022 | Tung | A61H 1/024 |

* cited by examiner

*Primary Examiner* — Ophelia A Hawthorne
(74) *Attorney, Agent, or Firm* — Sterne, Kessler, Goldstein & Fox P.L.L.C.

(57) ABSTRACT

A leg support exoskeleton is strapped on as a wearable device to support its user during squatting. The exoskeleton includes a knee joint connected to a first link and a second link, which is configured to allow flexion and extension motion between the first link and the second link. A force generator has a first end that is rotatably connected to the first link. A constraining mechanism is connected to the second link and has at least two operational positions. In a first operational position, the second end of the force generator engages the constraining mechanism, where the first link and the second link flex relative to each other. In a second operational position, the second end of the force generator does not engage the constraining mechanism; the first link and the second link are free to flex and extend relative to each other.

30 Claims, 28 Drawing Sheets

Related U.S. Application Data continuation of application No. 15/647,856, filed on Jul. 12, 2017, now Pat. No. 9,980,873, which is a continuation of application No. 15/194,489, filed on Jun. 27, 2016, now Pat. No. 9,744,093.

(60) Provisional application No. 62/185,185, filed on Jun. 26, 2015.

(52) U.S. Cl.
CPC ................ *A61H 2201/1676* (2013.01); *A61H 2201/5007* (2013.01); *A61H 2201/5061* (2013.01); *A61H 2203/0406* (2013.01); *A61H 2203/0418* (2013.01); *A61H 2205/102* (2013.01)

USE OF A LEG SUPPORT EXOSKELETON

CROSS-REFERENCE TO RELATED APPLICATIONS

This application is a continuation of U.S. patent application Ser. No. 15/972,419, filed on May 7, 2018, which is a continuation of U.S. patent application Ser. No. 15/647,856, filed on Jul. 12, 2017, and now granted as U.S. Pat. No. 9,980,873 on May 29, 2018, which is a continuation of U.S. patent application Ser. No. 15/194,489, filed on Jun. 27, 2016, and now granted as U.S. Pat. No. 9,744,093 on Aug. 29, 2017, which claims the benefit of U.S. Provisional Patent Application No. 62/185,185, filed Jun. 26, 2015, all of which are incorporated herein by reference along with all other references cited in this application and for all purposes.

BACKGROUND

This disclosure relates to the field of exoskeletons, and in particular exoskeletons for human legs.

Human beings have two legs to walk, run, jump, squat, and kick, which are all very human activities. The legs give mobility, and two-legged mobility gives a person a sense of wellbeing, which wheelchairs and the like cannot replace. Thus, when a person is disabled or loses his or her mobility in some way, this has devastating consequences on the person's quality of life. Exoskeletons can be used to restore some mobility, but existing exoskeletons have shortcomings.

Therefore, there is a need for an improved exoskeleton, and in particular, a leg support exoskeleton to support a person during squatting.

SUMMARY

A leg support exoskeleton is strapped on as a wearable device to support its user during squatting. The exoskeleton includes a knee joint connected to a first link and a second link, which is configured to allow flexion and extension motion between the first link and the second link. A force generator has a first end that is rotatably connected to the first link. A constraining mechanism is connected to the second link and has at least two operational positions. In a first operational position, the second end of the force generator engages the constraining mechanism, where the first link and the second link flex relative to each other. In a second operational position, the second end of the force generator does not engage the constraining mechanism; the first link and the second link are free to flex and extend relative to each other.

In an implementation, an exoskeleton leg apparatus is configured to be coupled to a lower extremity of a person. The apparatus includes: A knee joint is connected to a first link and a second link and is configured to allow flexion and extension motion between the first link and the second link. A force generator, where the first end of the force generator is rotatably connected to the first link. A constraining mechanism is connected to the second link having at least two operational positions. When the constraining mechanism is moved into its first operational position, the second end of the force generator engages the constraining mechanism, when the first link and the second link flex relative to each other. When the constraining mechanism is in its second operational position the second end of the force generator does not engage the constraining mechanism and the first link and the second link are free to flex and extend relative to each other.

In various implementations, the force generator can be a gas spring, compression spring, coil spring, leaf spring, air spring, tensile, or spring, or any combination of these. The first link is configured to move in unison with the person's thigh and the second link is configured to move in unison with a person's shank. The second link can be configured to move in unison with the person's thigh and the first link is configured to move in unison with a person's shank.

The constraining mechanism can include an indentation in the second link and an indentation filler connected to the second link having at least two operational positions. When the indentation filler is moved into its first operational position, the indentation is not occupied by the indentation filler and the second end of the force generator engages the indentation, only when the first link and the second link flex relative to each other. When the indentation filler is in its second operational position, the indentation is occupied by the indentation filler and the second end of the force generator does not engage the indentation and the first link and the second link are free to flex and extend relative to each other.

The constraining mechanism can include a pawl connected to the second link having at least two operational positions. When the pawl moves into its first operational position, the second end of the force generator engages to the pawl, only when the second link and the first link flex relative to each other. When the pawl moves into its second operational position, the second end of the force generator does not engage to the pawl and the first link and the second link are free to flex and extend relative to each other. The pawl can be rotatably coupled to the second link.

The constraining mechanism can be moved by the person into the operational positions. The exoskeleton leg can further include a manual tab having at least two positions and operable by the person or user. The manual tab moves the constraining mechanism to the first operational position when the person moves the tab to its first position. The manual tab moves the constraining mechanism to the second operational position when the person moves the tab to its second position.

The manual tab slides on the second link and has at least two positions relative to the second link. The manual tab can include a magnet where the magnetic force moves the constraining mechanism between positions of the constraining mechanism.

The exoskeleton leg apparatus can include a triggering mechanism capable of automatically moving the constraining mechanism into the two operational positions. The triggering mechanism moves the constraining mechanism to the first operational position when the human leg is in contact with the ground. The triggering mechanism moves the constraining mechanism to the second operational position when the human leg is not in contact with the ground.

The exoskeleton leg apparatus can include a triggering mechanism capable of automatically moving the constraining mechanism into the two operational positions. The triggering mechanism includes: (a) a transmission line, capable of transmitting motion and force, connected to the constraining mechanism on its first end and a stance detector on its second end, (b) a stance detector coupled to the transmission line from its second end, where the stance detector detects if the person's shoe is in contact with the ground, and (c) a return spring mounted on second link connected to the transmission line. When the exoskeleton leg is in contact with the ground, the stance detector moves the constraining mechanism to its first operational position through the transmission line. When the exoskeleton leg is not in contact with the ground, the return spring moves the constraining mechanism to its second operational position.

The stance detector can be located inside the user's shoe, the bottom of the person shoe, or in the person's shoe sole, or any combination of these. The transmission line can be a rope, wire rope, twine, thread, nylon rope, chain, or rod, or any combination of these. The transmission line is a hydraulic hose containing hydraulic fluid and the stance detector comprises a reservoir containing hydraulic fluid. When the apparatus is in contact with the ground, the pressure generated in the hydraulic fluid due to contact of the exoskeleton leg with the ground moves the constraining mechanism to its first operational position through the hydraulic hose. When the apparatus is not in contact with the ground, the return spring moves the constraining mechanism to its second operational position.

The exoskeleton leg apparatus can include a triggering mechanism capable of automatically moving the constraining mechanism into the two operational positions. The triggering mechanism includes: (a) an actuator capable of moving the constraining mechanism into the two operational positions, and (b) a stance sensor capable of detecting if the person's shoe is in contact with the ground by generating a first electric signal. When the apparatus is contacting the ground, the stance sensor generates a first electric signal and consequently, the actuator moves the constraining mechanism to its first operational position. When the apparatus is not contacting the ground, the stance sensor generates a second electric signal and consequently, the actuator moves the constraining mechanism to its second operational position.

The exoskeleton leg apparatus can include a triggering mechanism capable of automatically moving the constraining mechanism into the two operational positions. The triggering mechanism includes: (a) an actuator capable of moving the constraining mechanism into the two operational positions, (b) a stance sensor capable of detecting if the person's shoe is in contact with the ground by generating a first electric signal and (c) at least one contralateral stance sensor coupled to the person's contralateral leg capable of detecting if the person's contralateral shoe is in contact with the ground by generating a contralateral electric stance signal. When the apparatus is contacting the ground, the stance sensor generates a first electric signal and the actuator moves the constraining mechanism to its first operational position if the contralateral electric stance signal presents the contralateral leg is on the ground. When the apparatus is not contacting the ground, the stance sensor generates a second electric signal and consequently the actuator moves the constraining mechanism to its second operational position.

The stance sensor can be located inside the user's shoe, outside the person's shoe, or in the person's shoe sole, or any combination of these. The stance sensor can be located inside the user's shoe, outside the person's shoe, or in the person's shoe sole, or any combination of these. The stance sensor can be is selected from a group consisting of strain gage sensors, pressure sensors, force sensors, piezoelectric force sensor, and force sensors based on force sensing resistors, and any combination of these. The stance sensor is selected from a group consisting of strain gage sensors, pressure sensors, force sensors, piezoelectric force sensor, and force sensors based on force sensing resistors, and any combination of these.

The actuator is selected from a group consisting of solenoids, linear motors, electric motors, servos, DC motors, voice coil actuators, piezoelectric actuators, spring-loaded solenoids, spring-loaded motors, and any combination of these. The actuator is selected from a group consisting of solenoids, linear motors, electric motors, servos, DC motors, voice coil actuators, piezoelectric actuators, spring-loaded solenoids, spring-loaded motors, and any combination of these.

A foot link mechanism is connected to the first link or the second link, where the foot link mechanism includes at least one foot connector configured to move in unison with the user's foot. The foot connector can be located at a bottom of the user's shoe, inside a cavity within the shoe sole, or inside the user's shoe, or any combination of these.

The foot connector can quickly detach from the user's shoe. The foot connector can quickly detach from the foot link mechanism. The first link can include a torque adjustment mechanism to adjust a desirable resisting torque. The torque adjustment mechanism can include a screw connected or fastened to the first end of the force generator and a nut where the rotation of the nut moves the screw and the end of the force generator.

In an implementation, an exoskeleton leg apparatus is configured to be connected to a lower extremity of a person. The apparatus includes: (a) a thigh link configured to move in unison with the person's thigh, (b) a shank link configured to move in unison with the person's shank, (c) a knee joint connected to a shank link and a thigh link and configured to allow flexion and extension motion between the thigh link and the shank link, (d) force generator, where the first end of the force generator is rotatably connected to the shank link, (e) a constraining mechanism connected to the thigh link having least two operational positions, and (f) a manual tab capable of moving the constraining mechanism between the operational positions and operable by the person. When the constraining mechanism is moved into its first operational position through the operation of the manual tab, the second end of the force generator engages the constraining mechanism when the thigh link and the shank link flex relative to each other.

When the constraining mechanism is moved into its second operational position through the operation of the manual tab, the second end of the force generator does not engage the constraining mechanism and the shank link and the thigh link are free to flex and extend relative to each other.

In an implementation, an exoskeleton leg apparatus is configured to be connected to a lower extremity of a person. The apparatus includes: (a) a thigh link configured to move in unison with the person's thigh, (b) a shank link is configured to move in unison with the person's shank, (c) a knee joint is connected to a shank link and a thigh link and is configured to allow flexion and extension motion between the thigh link and the shank link, (d) a force generator, where the first end of the force generator is rotatably connected to the shank link, (e) a constraining mechanism connected to the thigh link having at least two operational positions wherein in its first operation position the second end of the force generator engages the constraining mechanism when the shank link and the thigh link flex toward each other and in its second operational position the second end of the force generator does not engage the constraining mechanism and the shank link and the thigh link are free to flex and extend relative to each other, (f) an actuator is capable of moving the constraining mechanism into the two operational positions, and (g) a stance sensor is capable of detecting if the person's shoe is in contact with the ground by generating a first electric signal.

When the apparatus is contacting the ground, the stance sensor generates a first electric signal and consequently, the actuator moves the constraining mechanism to its first operational position. When the apparatus is not contacting the ground, the stance sensor generates a second electric signal and consequently, the actuator moves the constraining mechanism to its second operational position.

Other objects, features, and advantages of the present disclosure will become apparent upon consideration of the following detailed description and the accompanying drawings, in which reference designations represent like features throughout the figures.

DETAILED DESCRIPTION

Various embodiments include an exoskeleton leg that supports the user's leg and knee while squatting. A device according to the disclosure reduces leg muscle strain while squatting, but allows the user to walk freely without any interference. Various embodiments are described more fully hereinafter with reference to the accompanying drawings, in which some, but not all embodiments are shown in the figures. These examples may be embodied in many different forms and should not be construed as limited to the embodiments set forth herein; rather, these embodiments are provided so that this disclosure will satisfy applicable legal requirements.

Figure 1:
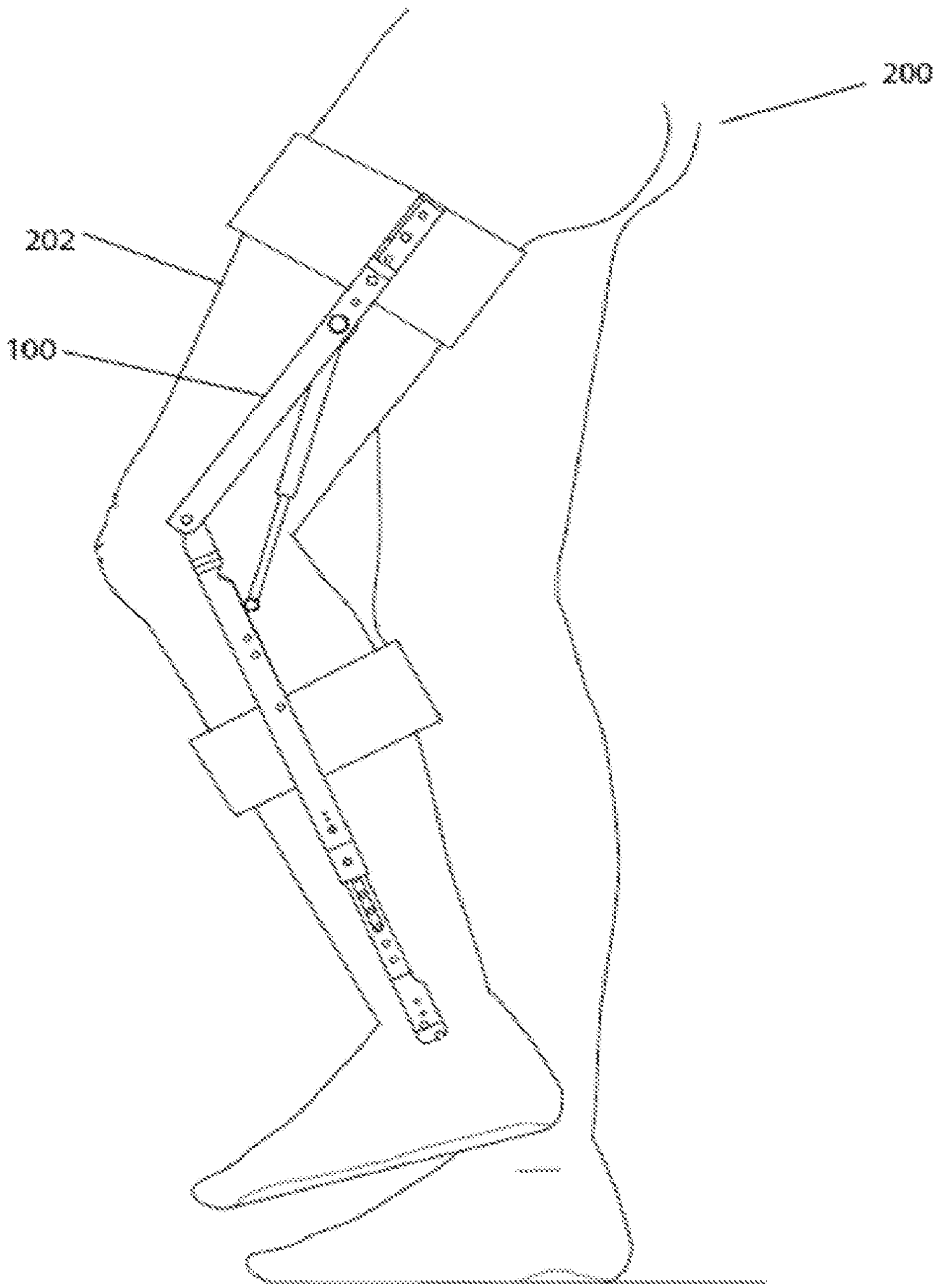
FIG. 1 shows an embodiment of an exoskeleton leg which is configured to be strapped on or otherwise connected to a lower extremity of a person.

FIG. 1 shows an embodiment of exoskeleton leg 100 which is configured to be strapped on or otherwise connected or coupled to a lower extremity 202 of a person 200.

Figure 2:
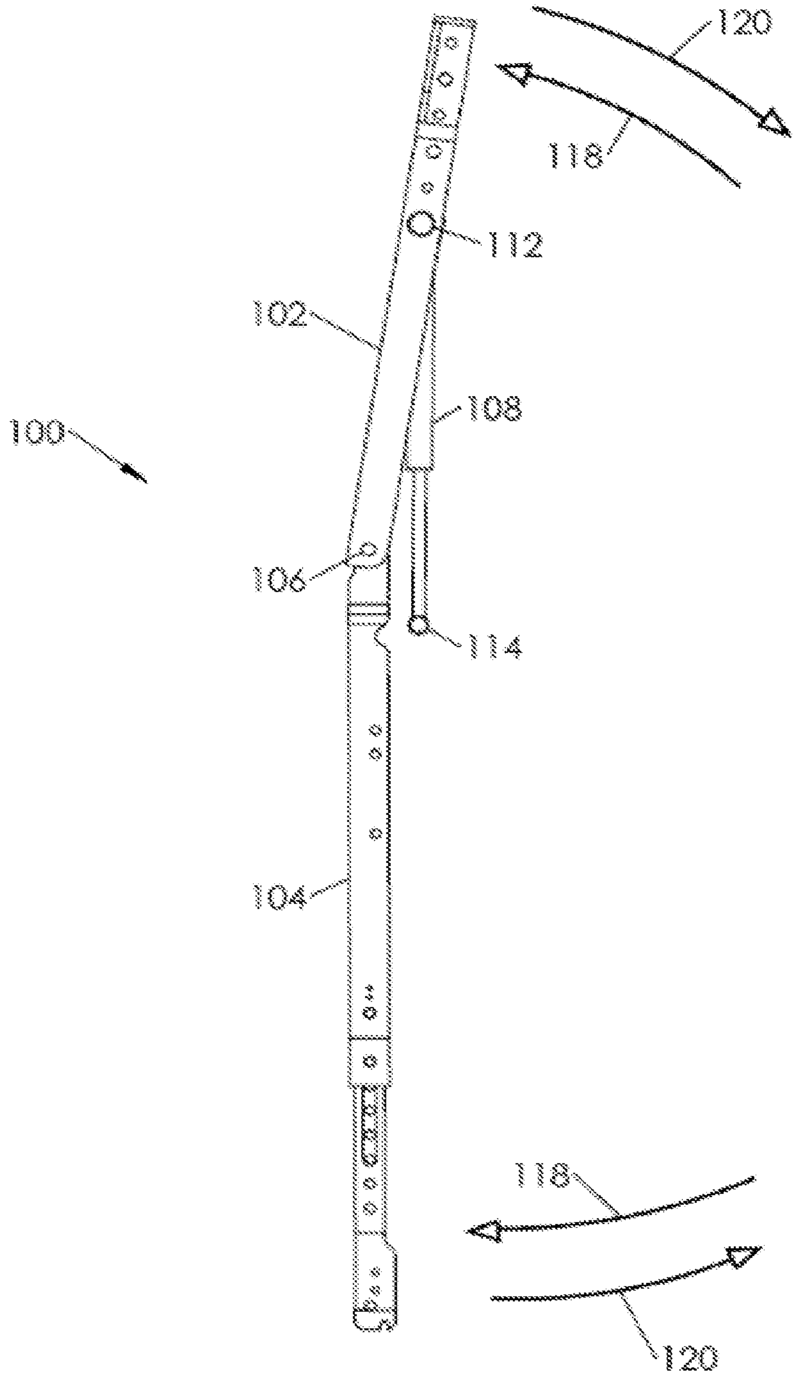
FIG. 2 shows the exoskeleton leg without the person.

FIG. 2 shows exoskeleton leg 100 without person 200. Exoskeleton leg 100, in addition to other things, comprises: a first link 102 which, in one embodiment, is configured to move in unison with a user's thigh 204; a second link 104 which, in one embodiment, is configured to move in unison with a user's shank 206; a knee joint 106 positioned between first link 102 and second link 104 and is configured to allow flexion and extension between first link 102 and second link 104, where flexion is shown by arrow 120 where first link 102 gets close to second link 104 and extension is shown by arrow 118 where first link 102 gets farther away from second link 104; a force generator 108, wherein the first end 112 of force generator 108 is rotatably coupled to first link 102; a constraining mechanism 130 which is coupled to second link 104 having at least two operational positions (or modes);

and a triggering mechanism 132 capable of moving constraining mechanism 130 into its two operational positions.

In operation, when constraining mechanism 130 is moved into its first operational position (or mode), second end 114 of force generator 108 gets rotatably latched to second link 104, only when first link 102 and second link 104 move in the first direction 120 relative to each other. This causes force generator 108 to create a force resisting motion in the first direction 120 of first link 102 relative to second link 104. It is important to realize that, in this first operational position, if first link 102 and second link 104 are moving in the second direction 118 relative to each other, constraining mechanism 130 does not constrain second end 114 of force generator 108 to the second link 104.

In operation when constraining mechanism 130 is moved into its second operational mode (or mode), second end 114 of force generator 108 is free to move and slide on second link 104 at all times (move unimpeded in both first direction 118 and second direction 120).

In summary, exoskeleton leg 100 provides assistance during squatting by moving into its first operational position, but allows for free and unconstrained walking by moving into its second operational position. In the first operational mode, force generator 108 provides a force to support the person during squatting; while in the second operational position, force generator 108 does not interfere with the person's walking and the person is free to walk without any interference from exoskeleton leg 100.

Figure 3:
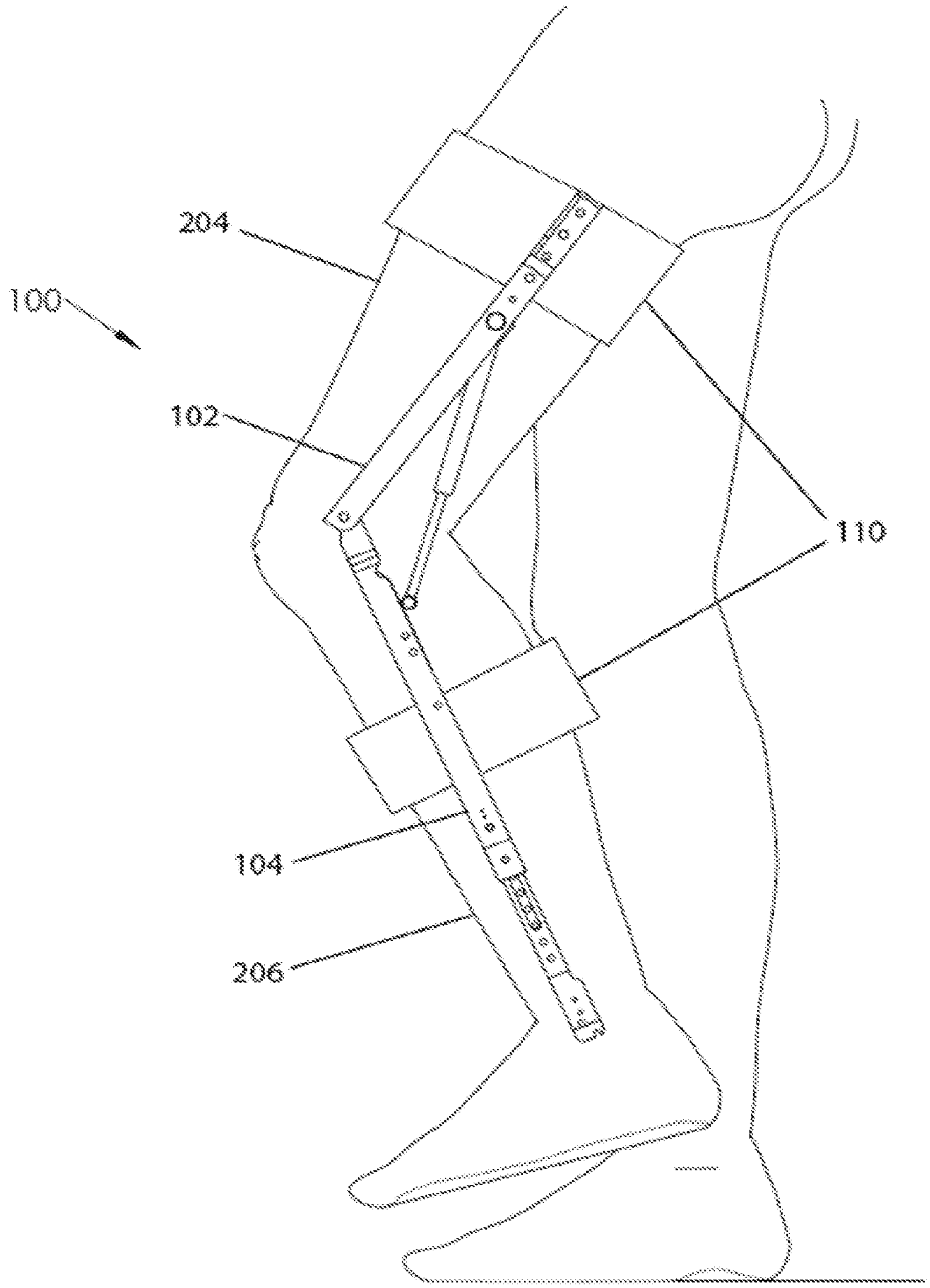
FIG. 3 shows an embodiment of an exoskeleton leg where a first link is configured to move in unison with a user's thigh and a second link is configured to move in unison with a user's shank.

FIG. 3 shows an embodiment of exoskeleton leg 100 which first link 102 is configured to move in unison with a user's shank 206. As shown in FIG. 3, in some embodiments, first link 102 and second link 103 are coupled to person's leg 208 with the help of braces 110.

Figure 4:
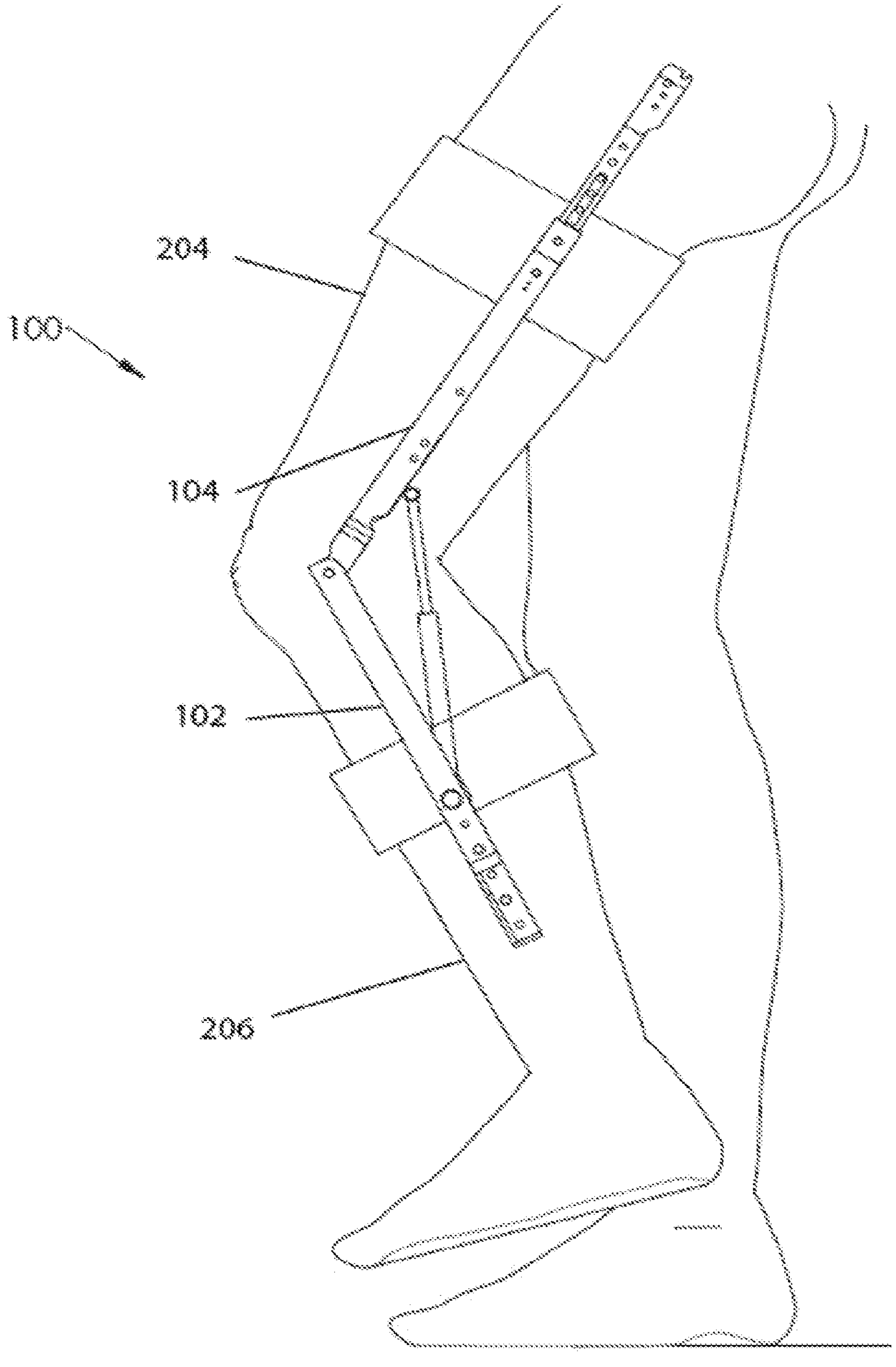
FIG. 4 shows an embodiment of an exoskeleton leg where a first link is configured to move in unison with a user's shank and a second link is configured to move in unison with a user's thigh.

FIG. 4 shows an embodiment of exoskeleton leg 100 which first link 102 is configured to move in unison with a user's thigh 204 and second link 104 is configured to move in unison with a user's shank 206.

Figure 6:
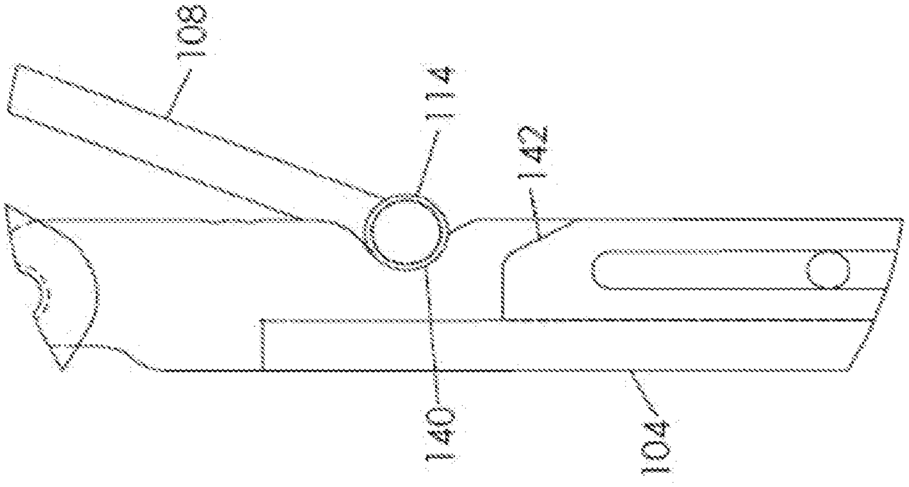
FIG. 6 shows in operation when a moving tab is in its first position.
Figure 5:
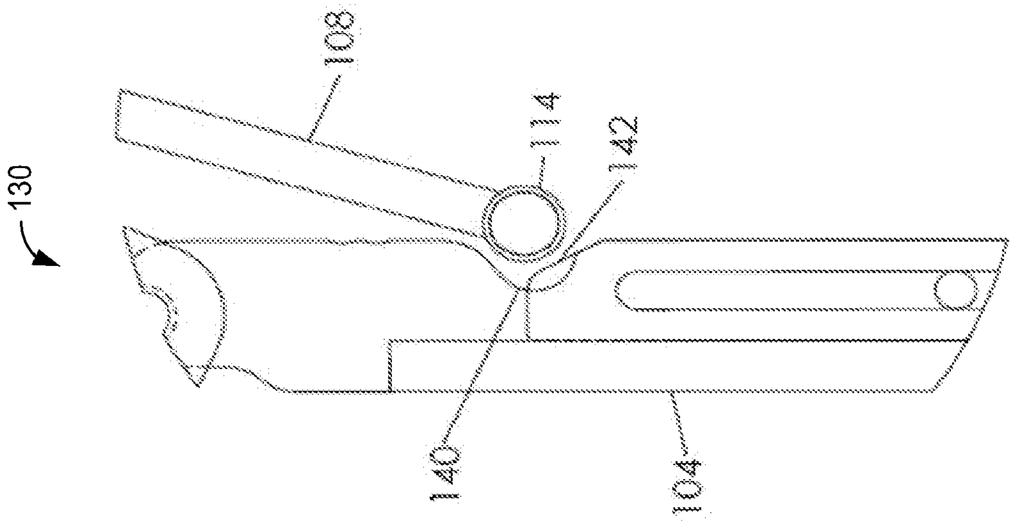
FIG. 5 shows an embodiment of a constraining mechanism.
Figure 7:
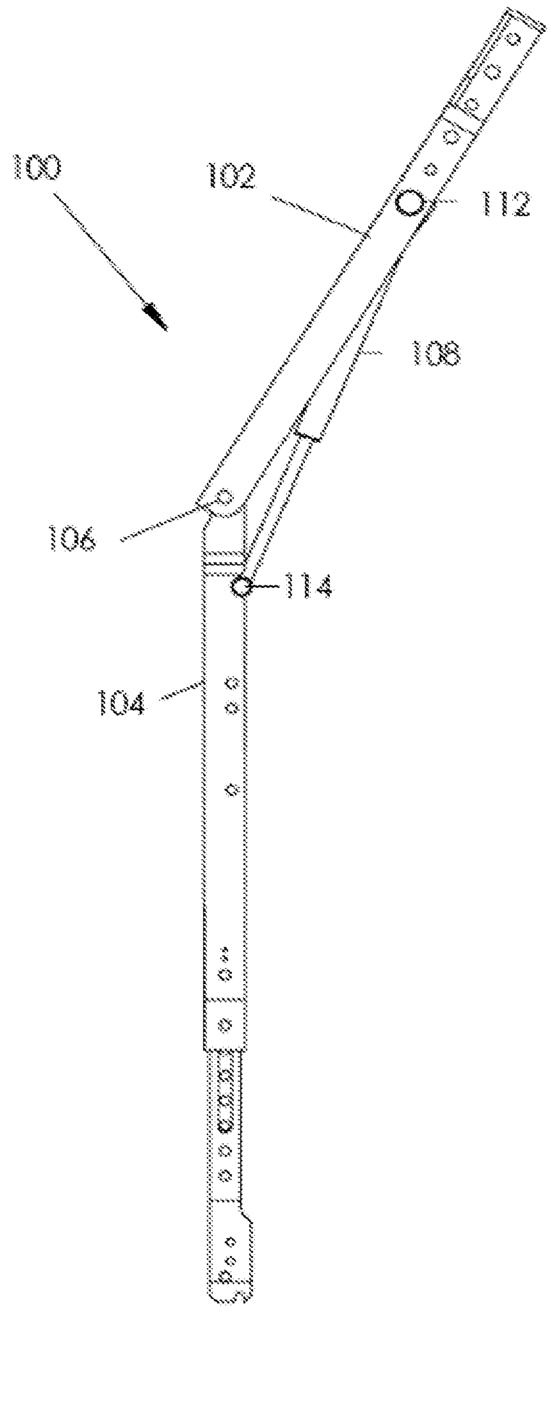
FIG. 7 shows an exoskeleton leg without a person.
Figure 8:
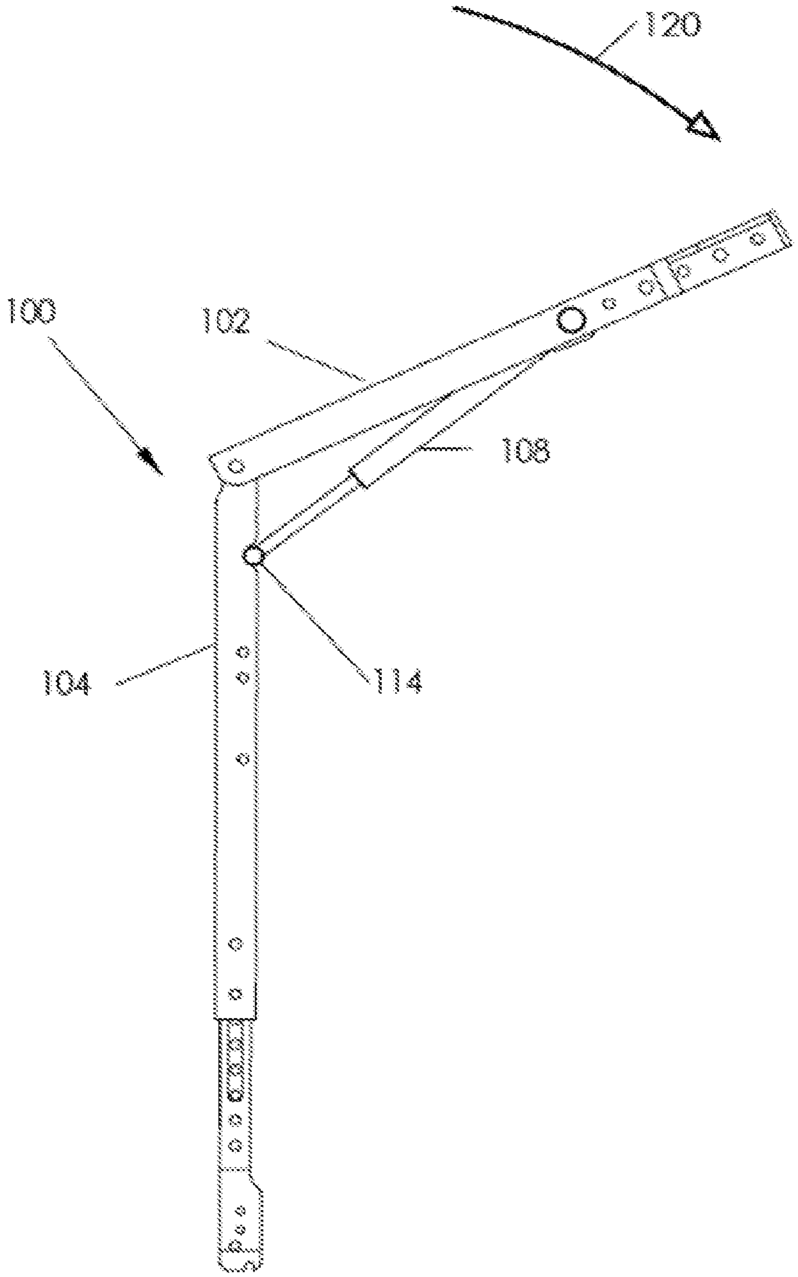
FIG. 8 shows a first link moves a flexion relative to a second link.
Figure 9:
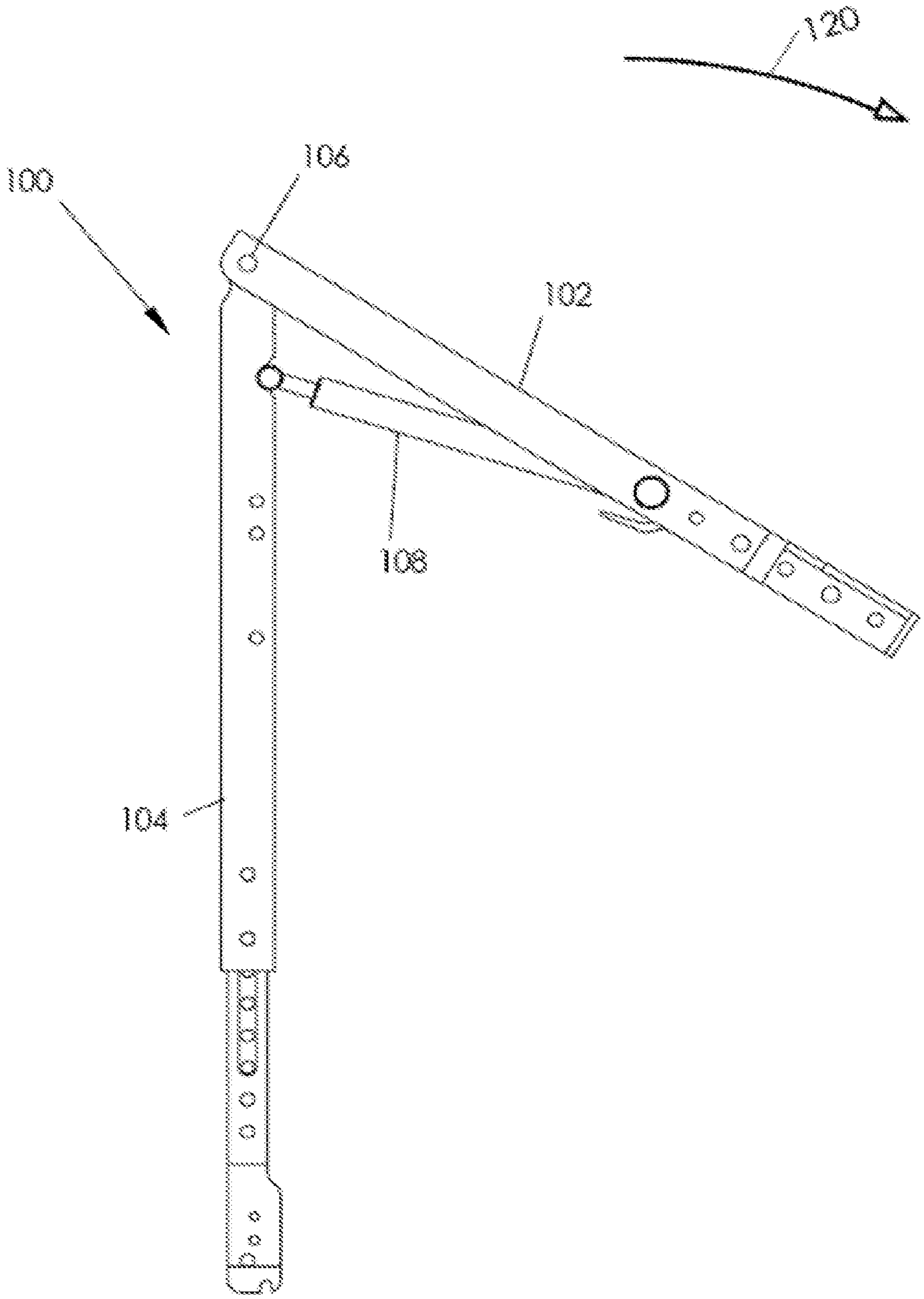
FIG. 9 shows a first link moves a flexion relative to a second link.
Figure 10:
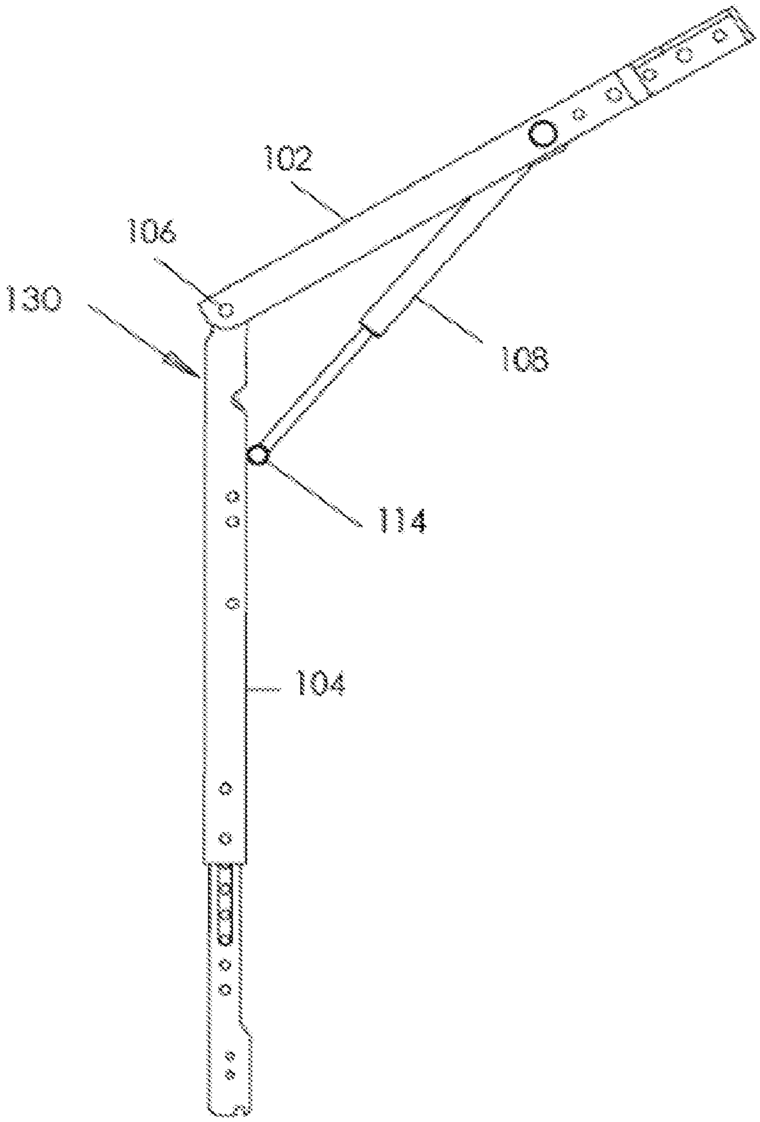
FIG. 10 shows an exoskeleton leg where a constraining mechanism is in its second position where motion in flexion and an extension between the first link and second link relative to each other are free.
Figure 11:
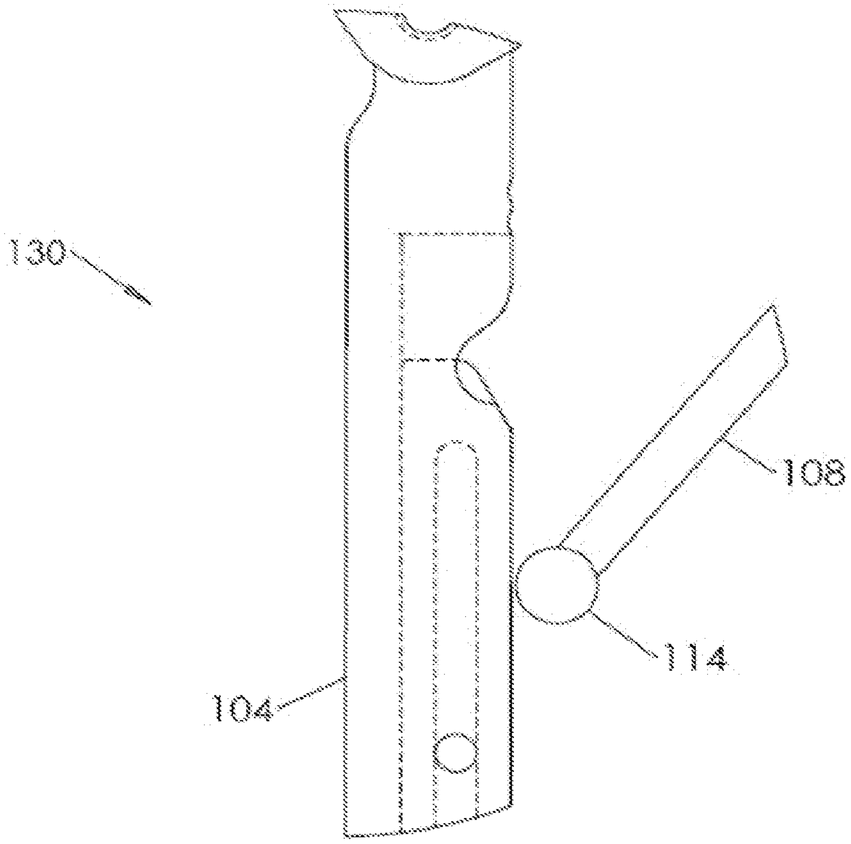
FIG. 11 shows an exoskeleton leg where a constraining mechanism is in its second position where motion flexion and an extension between the first link and second link relative to each other are free.

FIG. 5 shows an embodiment of constraining mechanism 130. In this embodiment, constraining mechanism 130 comprises an indentation 140 in second link 104 and an indentation filler 142 capable of moving relative to second link 104. In operation, when indentation filler 142 is in its first position as shown in FIG. 6, indentation 140 is not occupied by indentation filler 142. This means when first link 102 and second link 104 move in flexion 120 relative to each other, second end 114 of force generator 108 engages indentation 140. As first link 102 moves in flexion 120 relative to second link 104, the resisting force of force generator 108 resists the motion in flexion 120 of first link 102 relative to second link 104. This resisting force provides support for person 200 during squatting. This is shown in FIG. 6 through FIG. 9. However, when indentation filler 142 is moved into its second position as shown in FIG. 5, indentation 140 is occupied by indentation filler 142. This means that second end 114 of force generator 108 does not engage indentation 140 and therefore first link 102 and second link 104 are free to move in flexion 120 and extension 118 relative to each other. FIGS. 10 and 11 show exoskeleton leg 100 where constraining mechanism 130 is in its second position which motion in flexion 120 and extension 118 between the first link 102 and second link 104 relative to each other are free.

Figure 12:
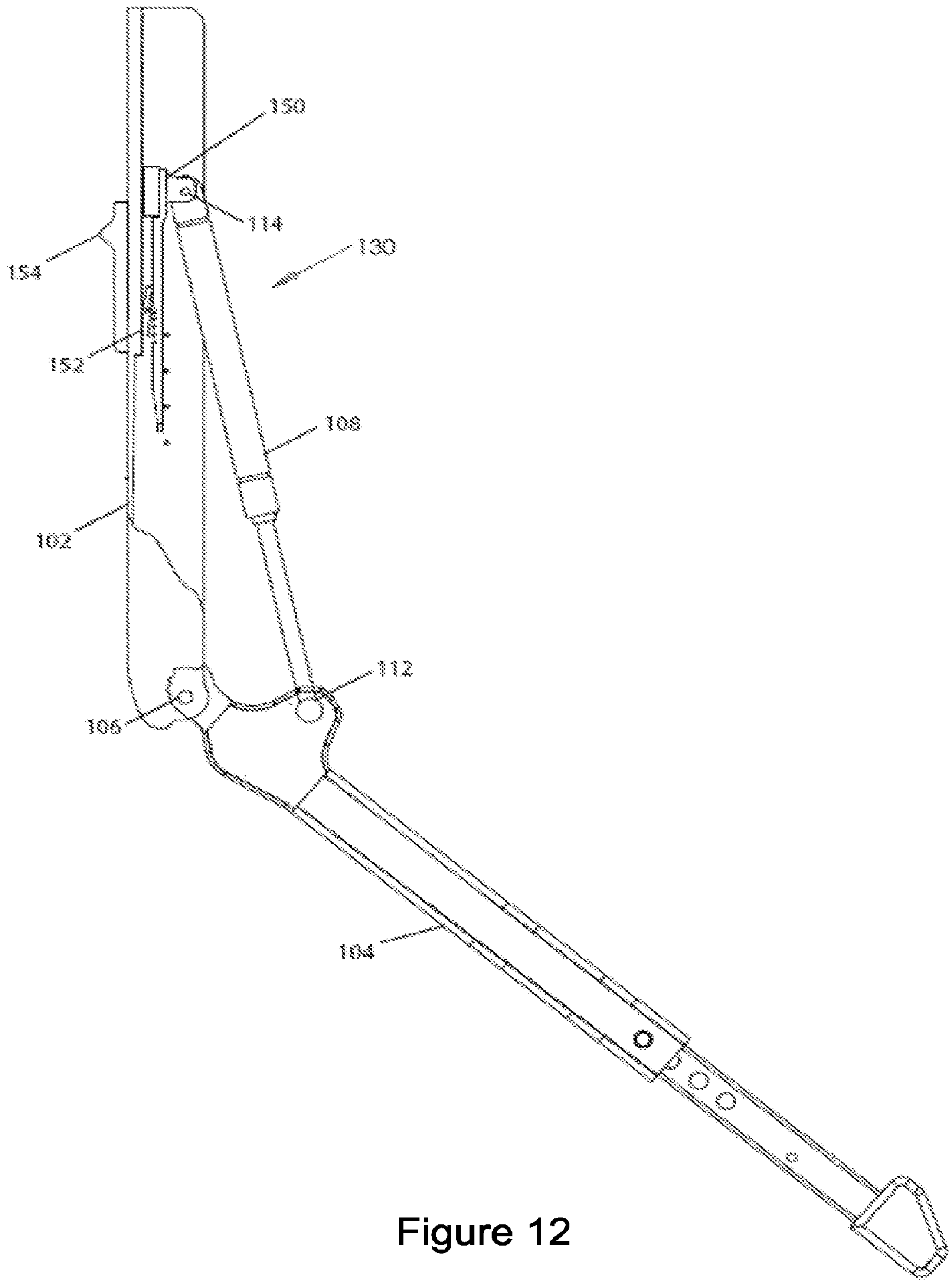
FIG. 12 shows another embodiment of a constraining mechanism.
Figure 14:
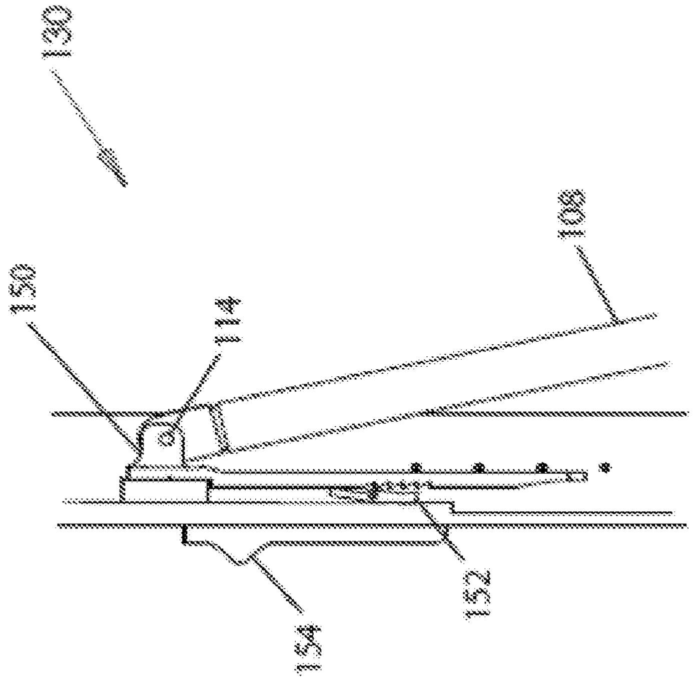
FIG. 14 shows an embodiment of a constraining mechanism in a second operating position.
Figure 13:
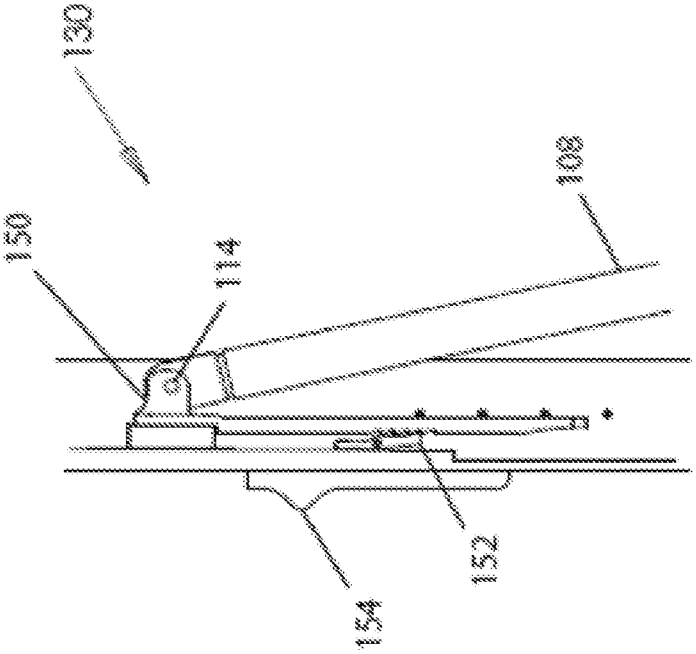
FIG. 13 shows an embodiment of a constraining mechanism in a first operating position.
Figure 15:
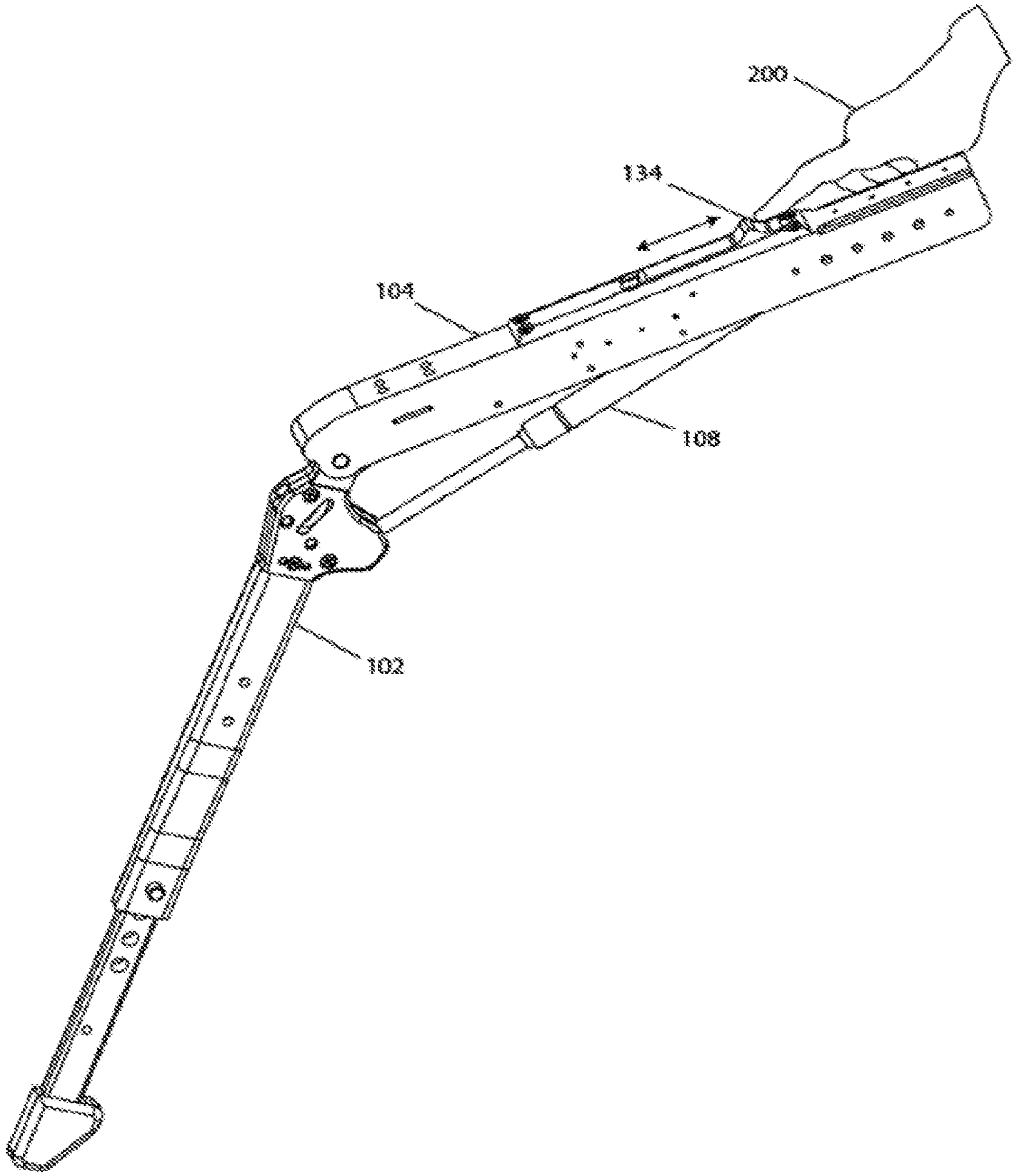
FIG. 15 shows an embodiment where a moving tab is moved manually by a person.

FIG. 12 shows another embodiment of constraining mechanism 130. In this embodiment, constraining mechanism 130 includes a pawl 152 on second link 104; and the triggering mechanism 132 comprises of a moving tab 154 capable of moving relative to second link 104. In operation, when moving tab 154 moves to its first position as shown in FIG. 12, pawl 152 moves into its first operational position and pawl 152 engages with a sliding ratchet 150 that is part of the second end 114 of force generator 108 such that the second end 114 of the force generator 108 engages to second link 104. See FIG. 13. This only occurs when first link 102 and second link 104 move in the first direction 120 relative to each other. However, when moving tab 154 moves into its second position and pawl 152 moves into its second operational position, pawl 152 does not engage with sliding ratchet 150 and the second end of said force generator does not latch onto said first link; and said first link and said second link are free to flex and extend relative to each other as shown in FIG. 14. FIG. 15 shows an embodiment where constraining mechanism 130 is moved by person 200 into its operational positions.

In some embodiments, exoskeleton leg 100 includes a manual tab 134 having at least two positions and operable by person 200. In some embodiments, as shown in FIG. 15, manual tab 134 slides on second link 104 and has at least two positions relative to second link 104. In operation, when person 200 moves manual tab 134 to its first position so that the constraining mechanism 130 is in its first operational position, force generator 108 engages the indentation 140 when person 200 squats. The engagement of forces generator 108 to indentation 140, causes a supporting force during squatting. This decreases the person's knee torque and provides support for person 200. When person 200 moves manual tab 134 to its second position so that the constraining mechanism 130 is in its second operational position, force generator 108 does not engage the indentation 140 when person 200 squats, walks, or does any movements. This allows person 200 to move freely and unimpeded.

In some embodiments, manual tab 134 includes a magnet where the magnetic force moves constraining mechanism 130 between its two positions. This arrangement reduces the necessary linkage between manual tab 134 and constraining mechanism 130.

Figure 16:
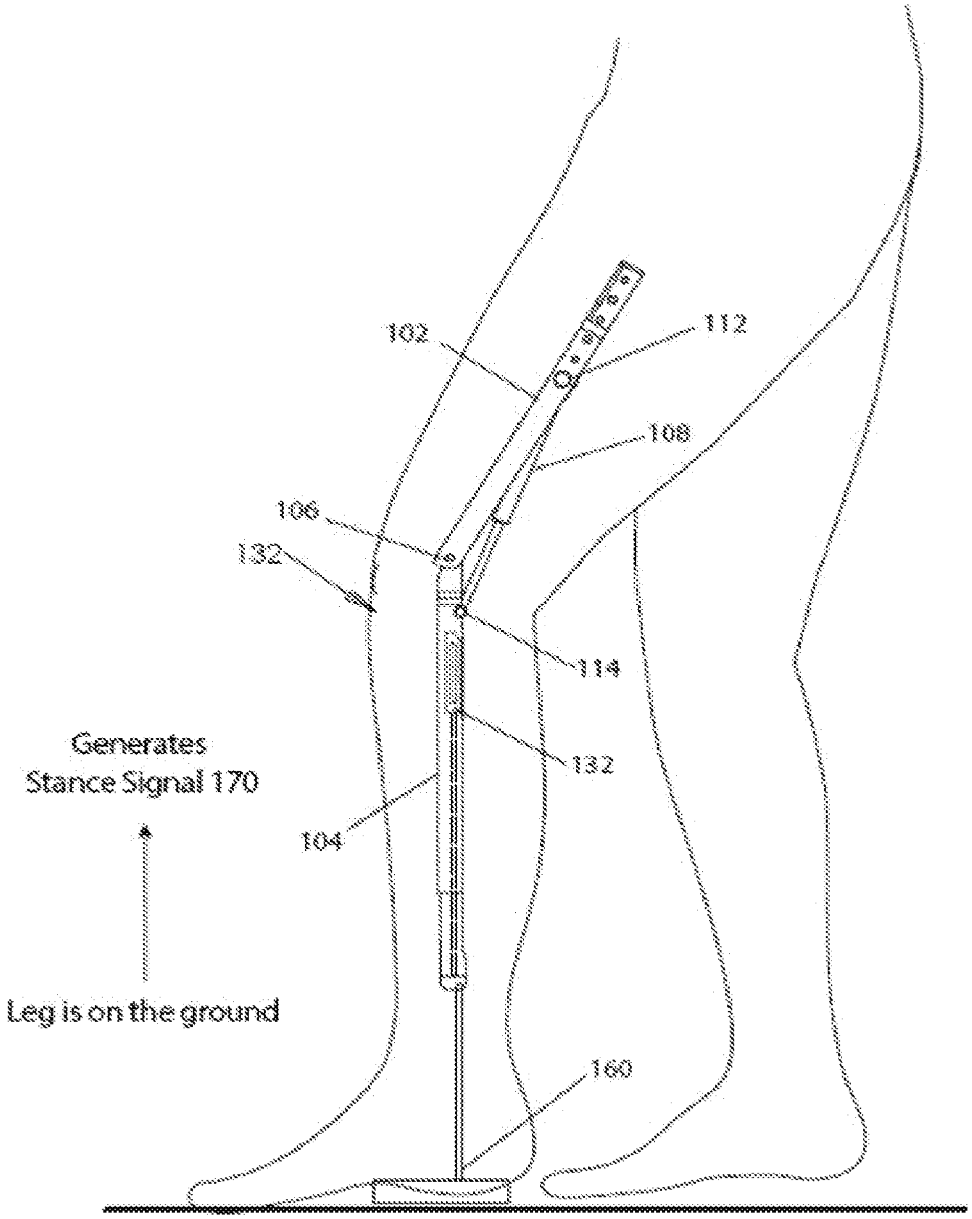
FIG. 16 shows an embodiment where a triggering mechanism is moved by a stance sensing module connected to the exoskeleton leg.
Figure 17:
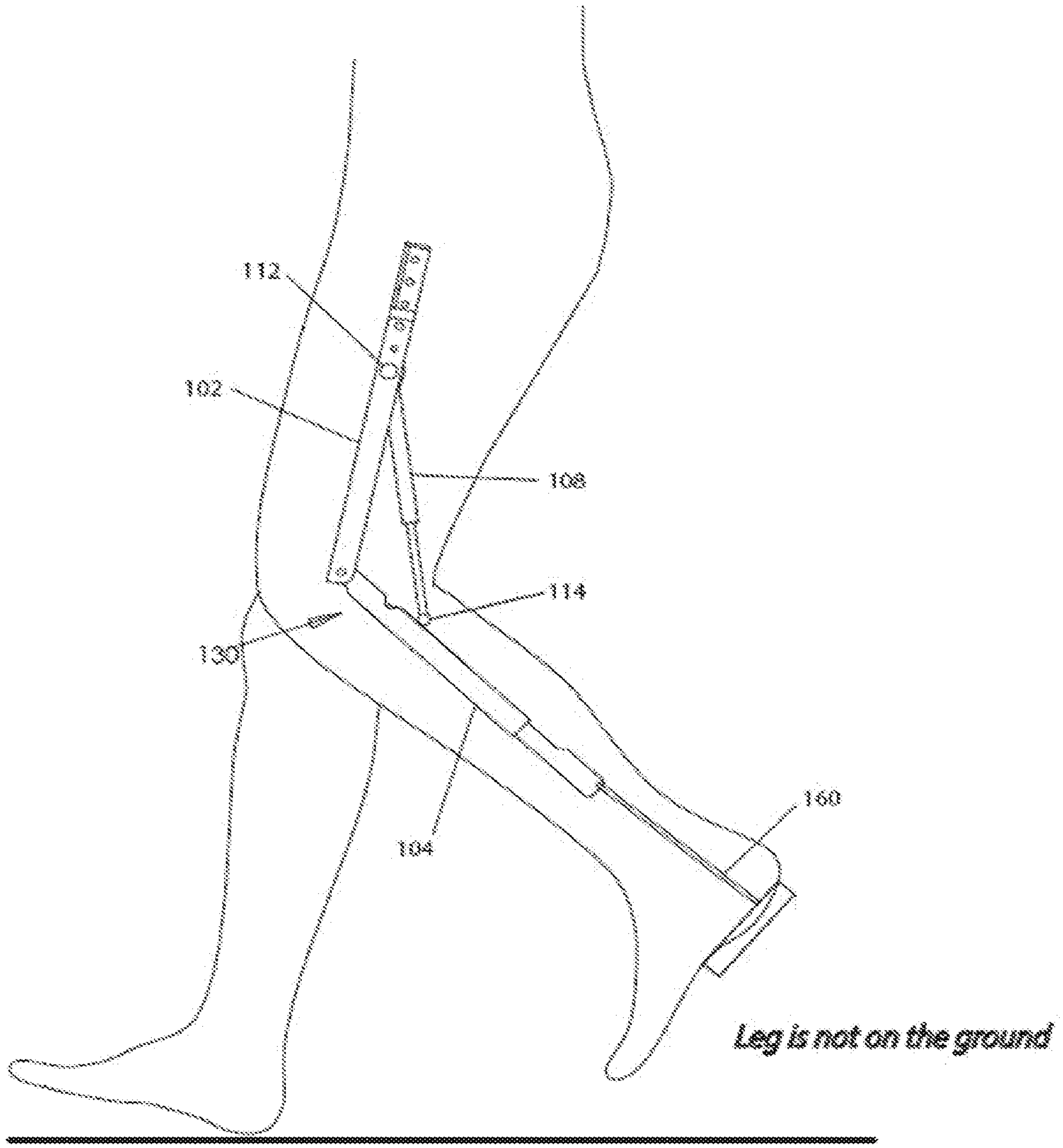
FIG. 17 shows an embodiment where the leg is off the ground and a stance sensing module triggers the second operational position of the constraining mechanism.
Figure 18:
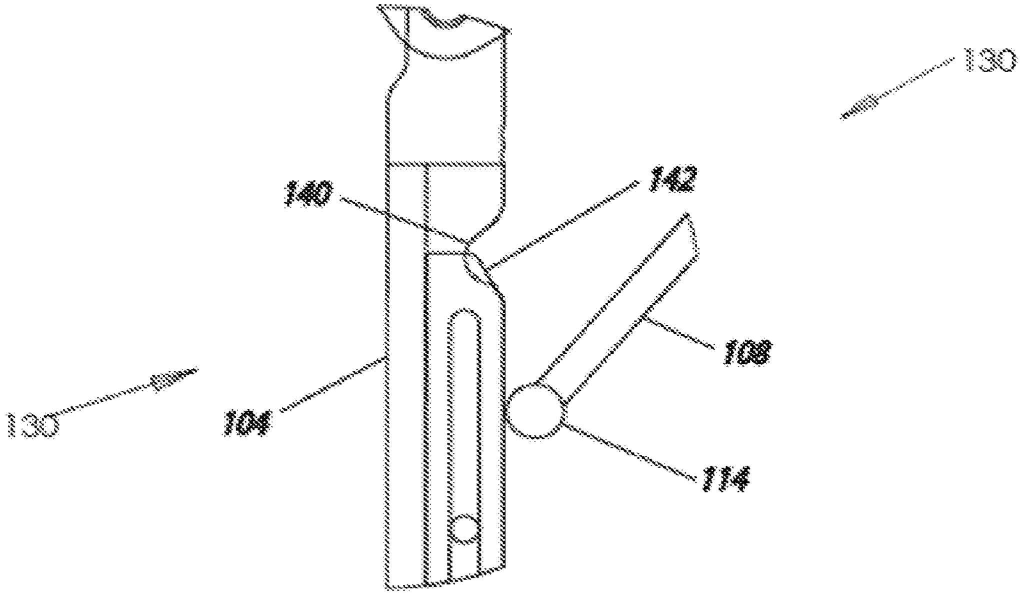
FIG. 18 shows a constraint mechanism is in a second operational position of the constraining mechanism.

FIG. 16 shows an embodiment where exoskeleton leg 100 includes a triggering mechanism 132 capable of automatically moving constraining mechanism into two operational positions. Triggering mechanism 132 includes a stance detector 160 that is connected to exoskeleton leg 100. When stance detector 160 declares person's leg 208 is on the ground, stance detector 160 generates a stance signal 170 and moves constraining mechanism 130 to its first operational position. When constraining mechanism 130 is in its first operational position, force generator 108 is able to engage indentation 140, causing a supporting force during squatting. This decreases the person's knee torque and provides support for person 200. However, when stance detector 160 declares person's leg 208 is not on the ground, stance detector 160 moves constraining mechanism 130 to its second operational position. In this position, force generator 108 does not engage indentation 140 when person 200 squats, walks, or does any movements. This allows person 200 to move freely and unimpeded. See FIGS. 17 and 18.

Figure 19:
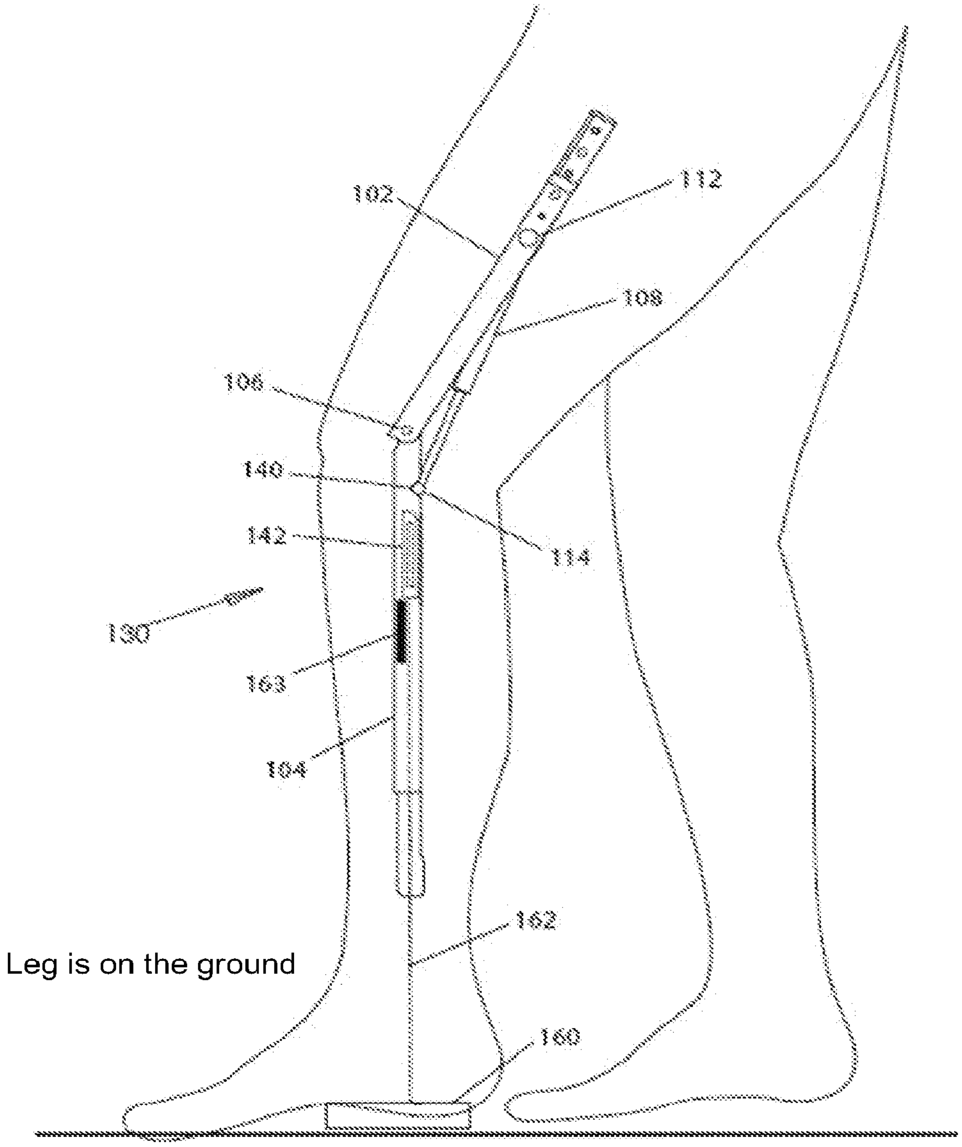
FIG. 19 shows an embodiment where the leg is on the ground and a stance sensing module uses a transmission line to trigger the first operational position of the constraining mechanism.
Figure 20:
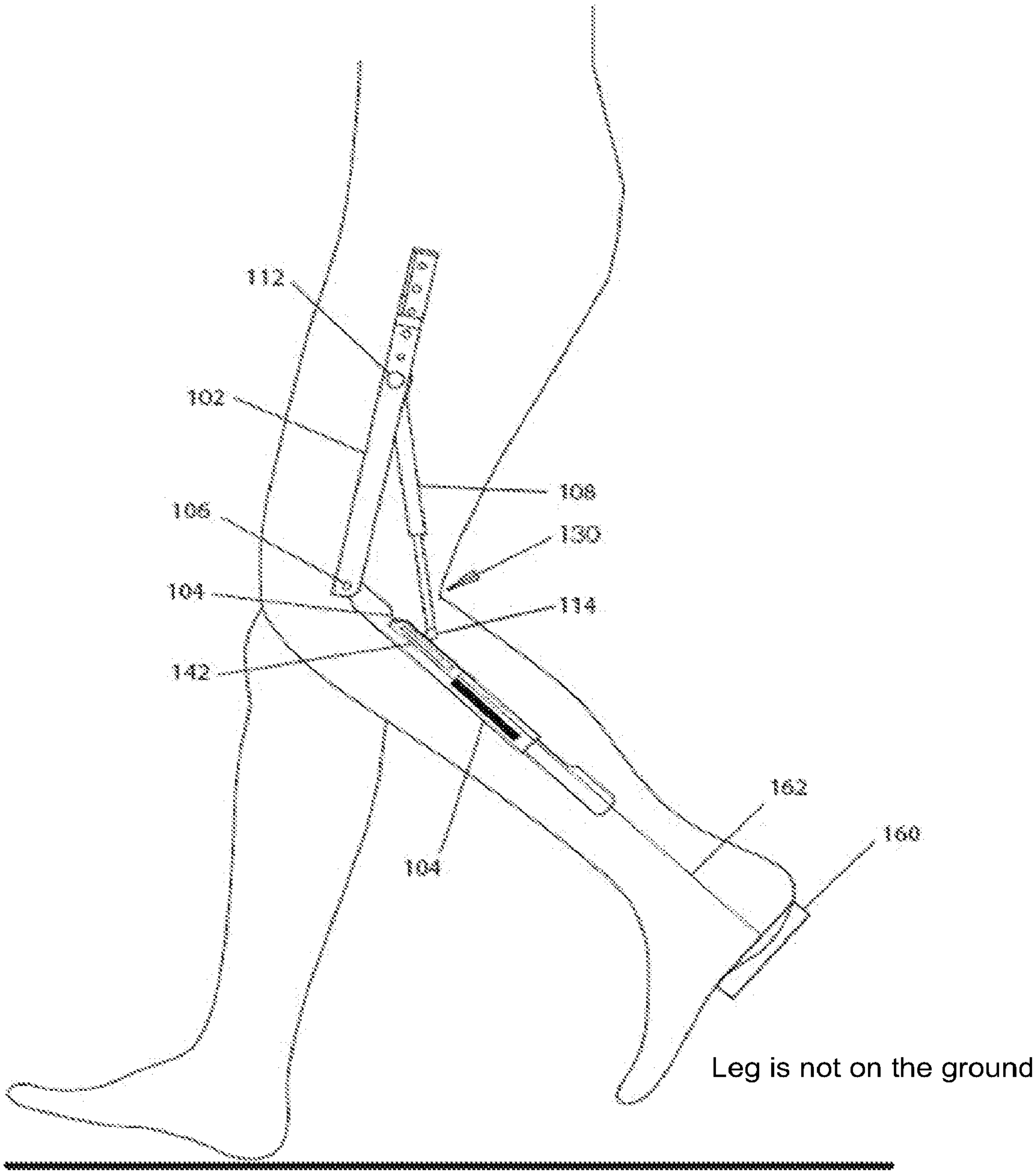
FIG. 20 shows an embodiment where the leg is not on the ground and the stance sensing module triggers the second operational position of the constraining mechanism.

FIG. 19 shows an embodiment where a triggering mechanism 132 automatically moves constraining mechanism 130 into two operational positions. Triggering mechanism 132 includes a stance detector 160 and a transmission line 162 that is connected to constraining mechanism 130 from one end and stance detector 160 from its second end. In operation, when stance detector 160 declares person's leg 208 is on the ground, transmission line 162 is pulled and indentation filler 142 is moved to its first position, allowing force generator 108 to engage indentation 140. However, when stance detector 160 declares person's leg 208 is not on the ground, as shown in FIG. 20, transmission line 162 is released, and return spring 163 moves indentation filler 142 to its second position, not allowing force generator 108 to engage indentation 140. This allows person 200 to move freely and unimpededly.

In some embodiments, stance detector 160 is located inside user's shoe 212. In some embodiments, stance detector 160 is located on the bottom of user's shoe 212. In some embodiments, detector 160 is located in user's shoe sole. An ordinary person skilled in the art will recognize transmission line 162 can be selected from a set consisting of rope, wire rope, twine, thread, nylon rope, chain, and rod, and any combination of these.

Figure 21:
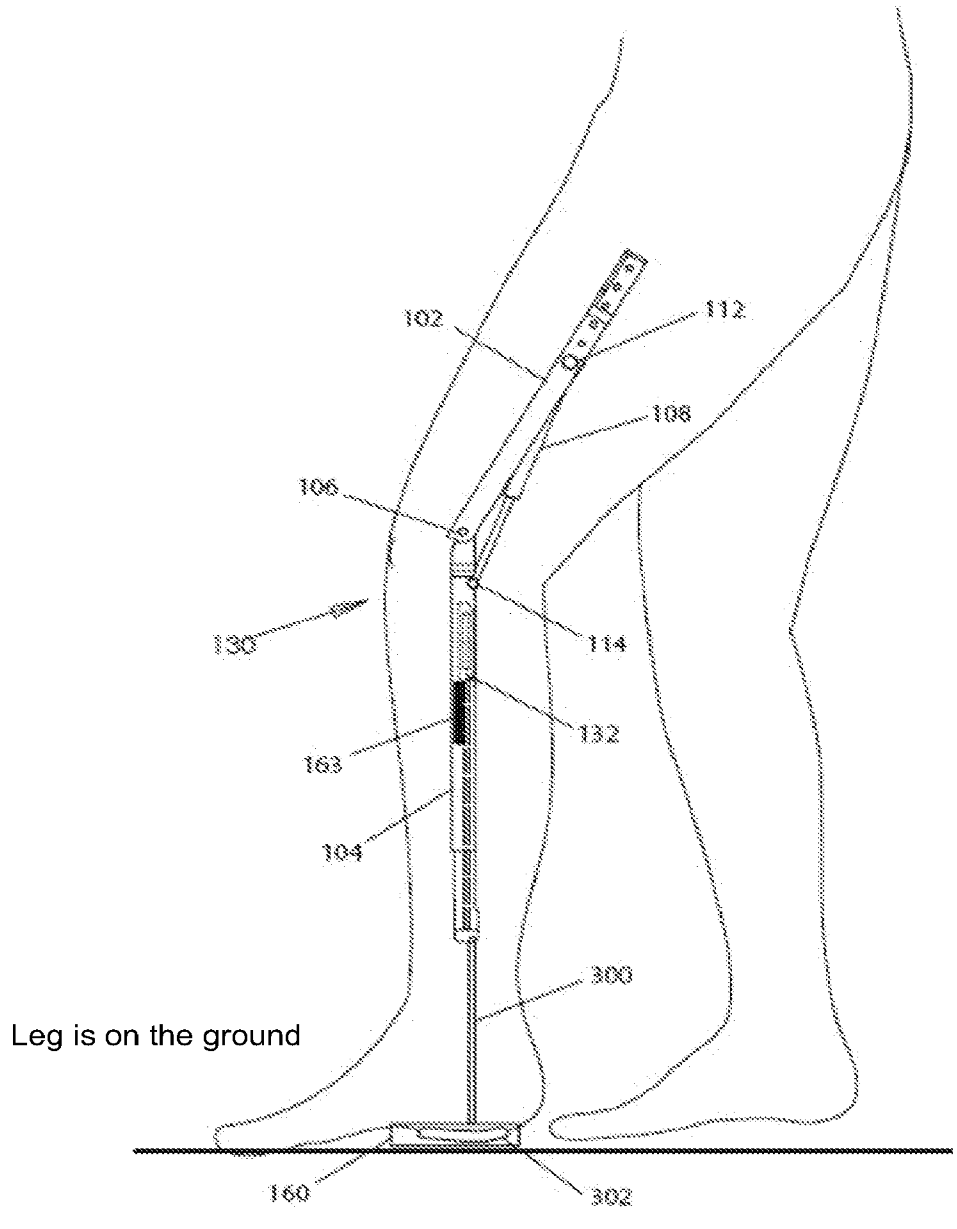
FIG. 21 shows an embodiment where the leg is on the ground and a hydraulics stance detector triggers the first operational position of the constraining mechanism.

FIG. 21 shows an embodiment where transmission line 162 is a hydraulic hose 300 containing hydraulic fluid and stance detector 160 includes a reservoir 302 filled with hydraulic fluid. In operation, when exoskeleton leg 100 is in contact with the ground, the pressure generated in hydraulic fluid due to contact of exoskeleton leg 100 with the ground moves constraining mechanism 130 to its first operational position through hydraulic hose 300 and when exoskeleton leg 100 is not in contact with the ground, return spring 163 moves constraining mechanism 130 to its second operational position.

Figure 22:
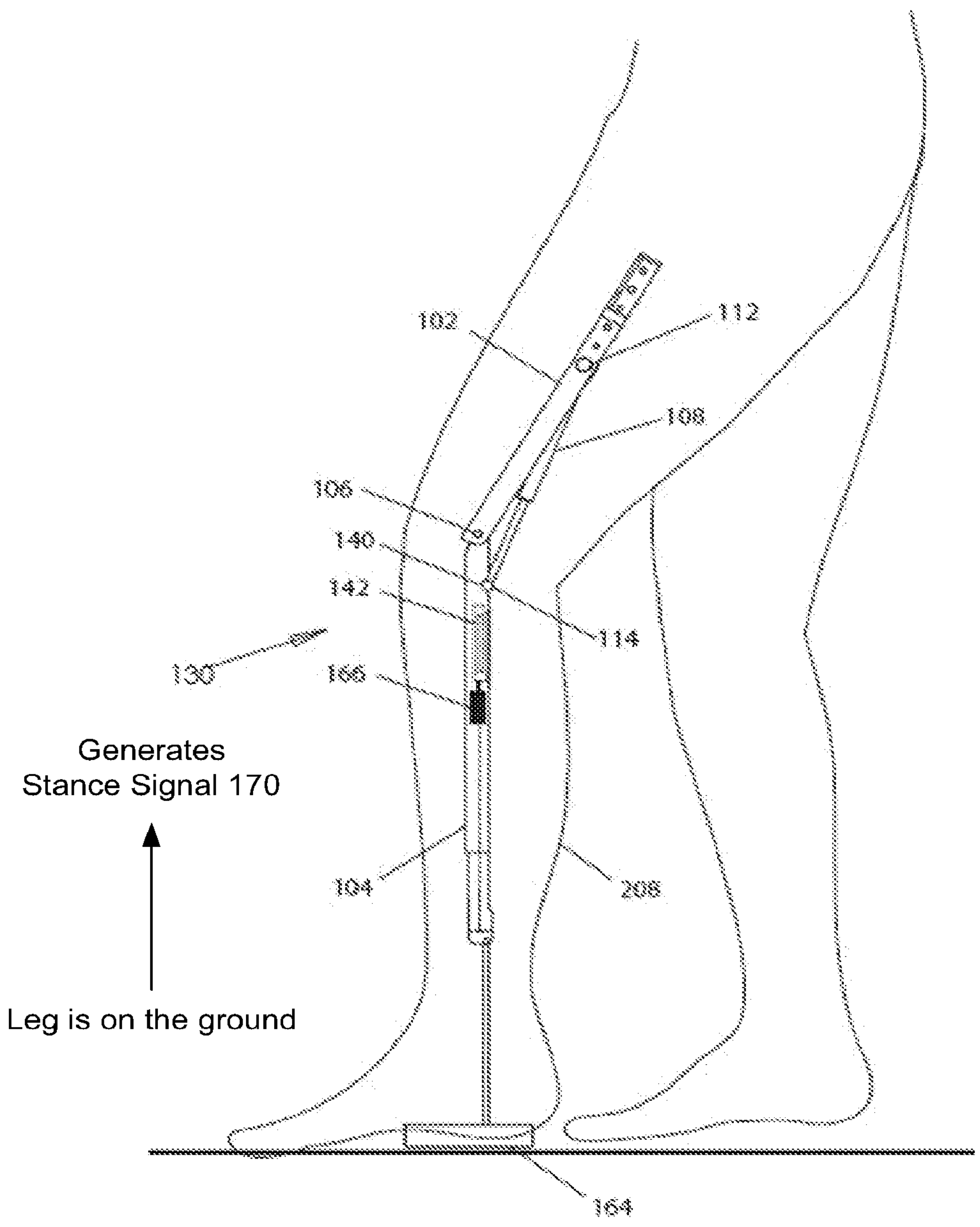
FIG. 22 shows an embodiment where the leg is on the ground and a triggering mechanism includes a stance sensor that is capable of generating a stance signal that triggers the first operational position of the constraining mechanism.

In some embodiments as shown in FIG. 22, triggering mechanism 132 includes of a stance sensor 164 that is capable of generating a stance signal 170 when person's leg 208 is in the stance phase. Triggering mechanism 132 further includes of an actuator 166 connected or coupled to constraining mechanism 130 such that actuator 166 is capable of moving indentation filler 142 in and out of indentation 140.

In operation, when stance sensor 164 declares person's leg 208 is on the ground, actuator 166 moves indentation filler 142 away from indentation 140 allowing force generator 108 to engage indentation 140. This allows a supporting force to be generated during squatting. This decreases the person's knee torque and provides support for person 200. However, when stance sensor 160 declares the person's leg 208 is not on the ground, actuator 166 moves indentation filler 142 into indentation 140 preventing force generator 108 from engaging indentation 140. In this position, force generator 108 does not engage indentation 140 when person 200 squats, walks, or does any movements. This allows person 200 to move freely and unimpeded.

Figure 23:
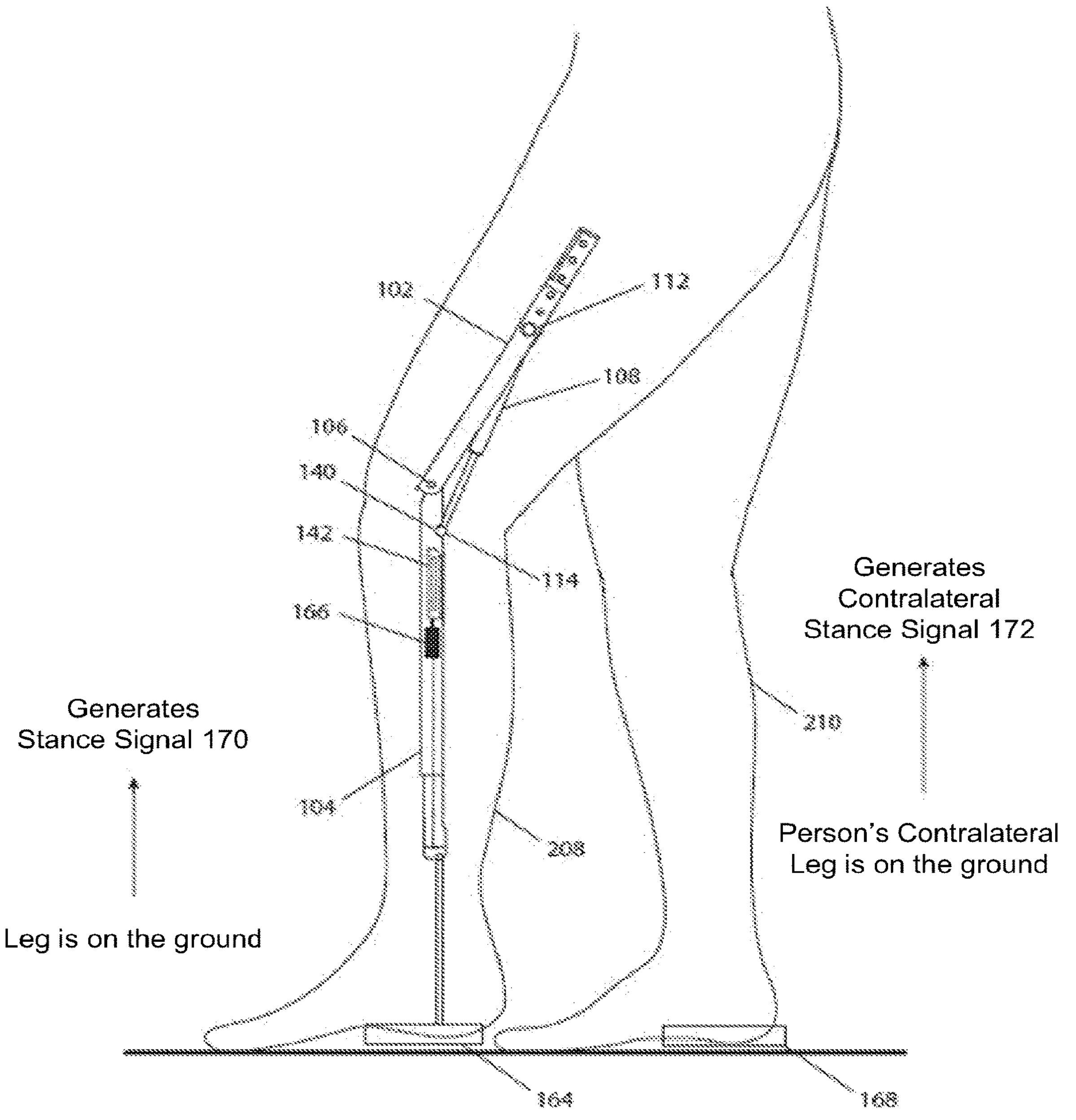
FIG. 23 shows an embodiment where a triggering mechanism includes a stance sensor and a contralateral stance sensor which generates a stance signal and a contralateral stance signal to trigger the operational position of the constraint mechanism.

FIG. 23 shows another embodiment. Triggering mechanism 132 includes a stance sensor 164 that is capable of generating a stance signal 170. Triggering mechanism 132 further includes an actuator 166 connected or coupled to constraining mechanism 130 such that actuator 166 is capable of moving indentation filler 142 in and out of indentation 140. Triggering mechanism 132 additionally includes a contralateral stance sensor 168 that is connected to the person's contralateral leg 210 whereas contralateral stance sensor 168 is capable of generating a contralateral stance signal 172 when person's contralateral leg 210 is contacting the ground. When stance sensor 164 and contralateral stance sensor 168 declare person's leg 208 and person's contralateral leg 210 are on the ground, actuator 166 moves indentation filler 142 away from indentation 140 allowing force generator 108 to engage indentation 140. This allows a supporting force to be generated during squatting. This decreases the person's knee torque and provides support for person 200. However, when either stance sensor 160 or contralateral stance sensor 168 declares the person's leg 208 or person's contralateral leg 210 is not on the ground, actuator 166 moves indentation filler 142 into indentation 140 preventing force generator 108 from engaging indentation 140. In this position, force generator 108 does not engage indentation 140 when person 200 squats, walks, or doing any movements. This allows person 200 to move freely and unimpeded.

In some embodiments, stance sensor 164 is located inside user's shoe 212. In some embodiments, stance sensor 164 is located on the bottom of user's shoe 212. In some embodiments, stance sensor 164 is located in user's shoe sole.

An ordinary person skilled in the art will recognize stance sensor 164 can be selected from a set consisting of strain gauge sensors, pressure sensors, force sensors, piezoelectric force sensor, and force sensors based on force sensing resistors, and any combination of these. An ordinary person skilled in the art will recognize actuator 166 can be selected from a set consisting of solenoids, linear motors, electric motors, servos, DC motors, voice coil actuators, piezoelectric actuators, spring-loaded solenoids, and spring-loaded motors, and a combination of these.

Figure 25:
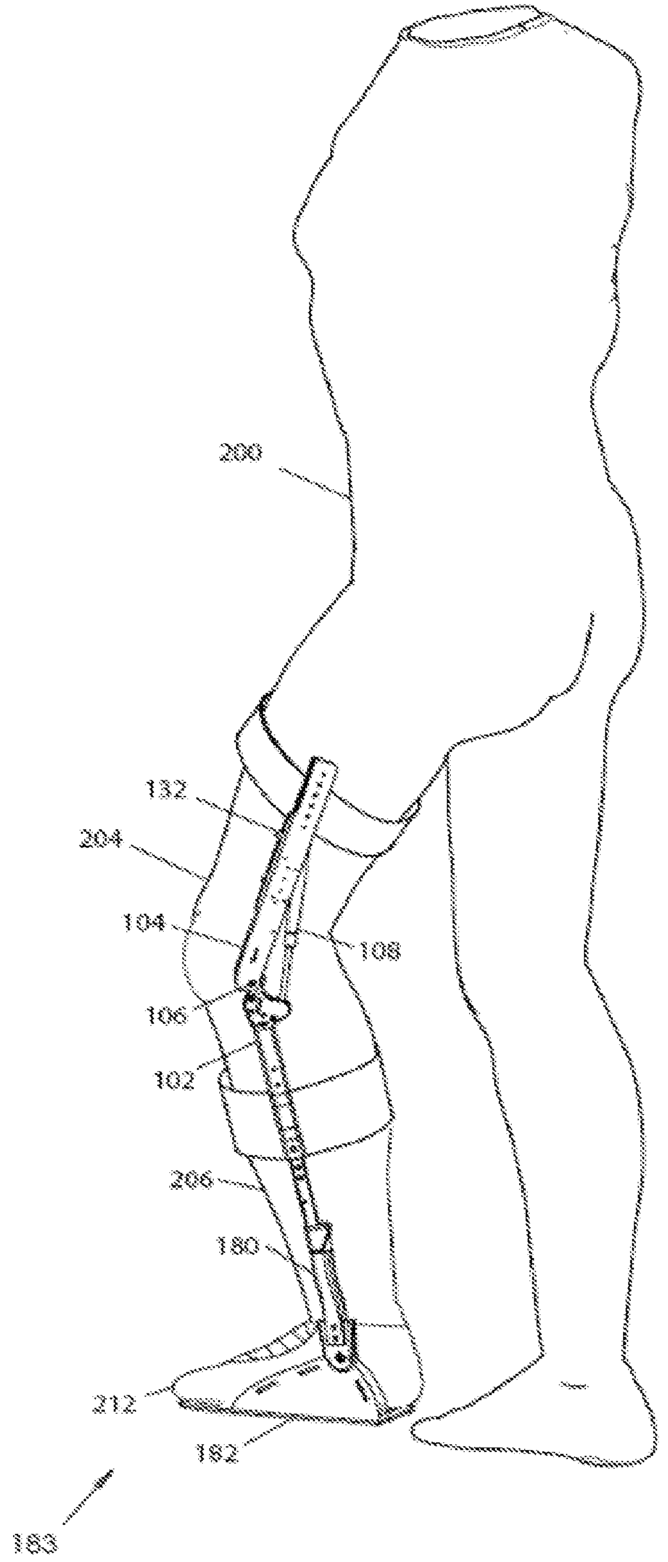
FIG. 25 shows an embodiment of an exoskeleton leg where a foot link mechanism includes a first ankle link that is connected to a first link.
Figure 26:
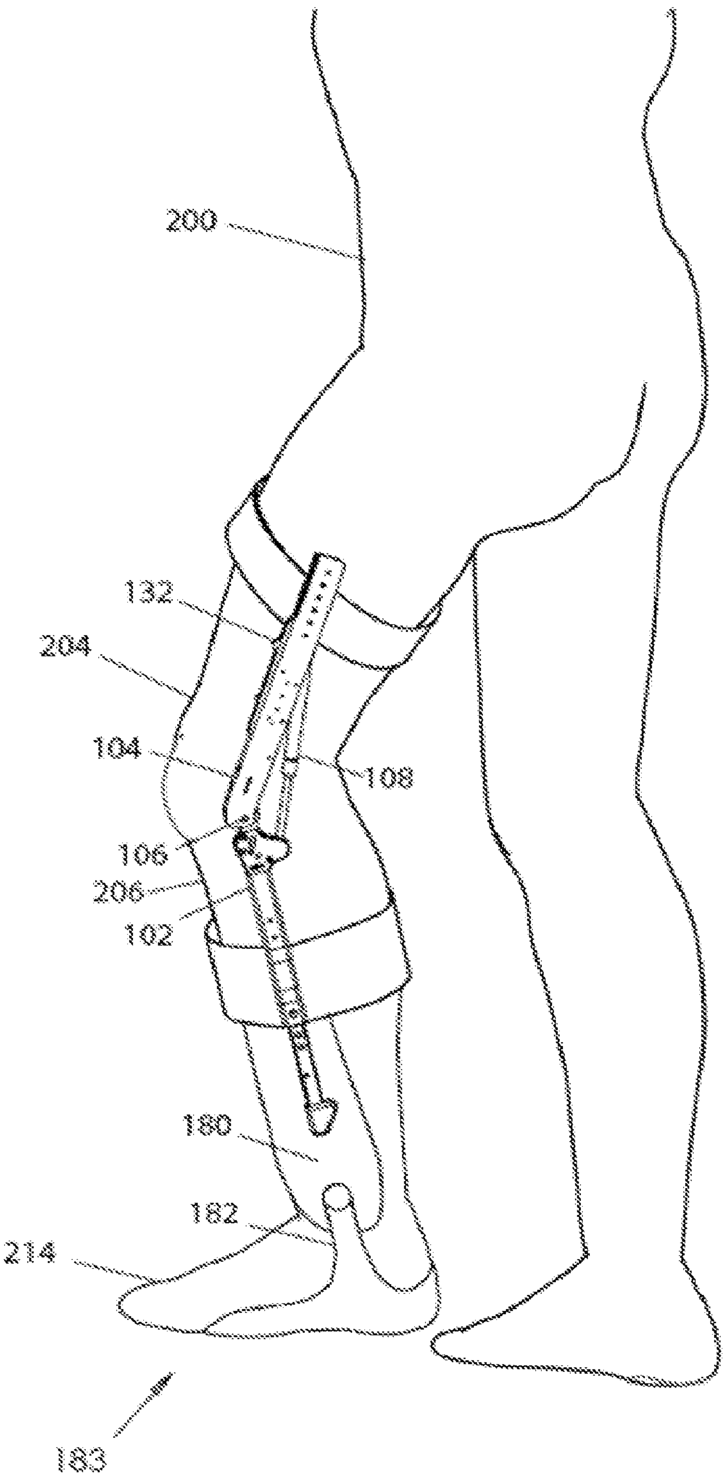
FIG. 26 shows an embodiment where a foot connector is located inside a user's shoe. The shoe has been removed from the image for clarity.
Figure 27:
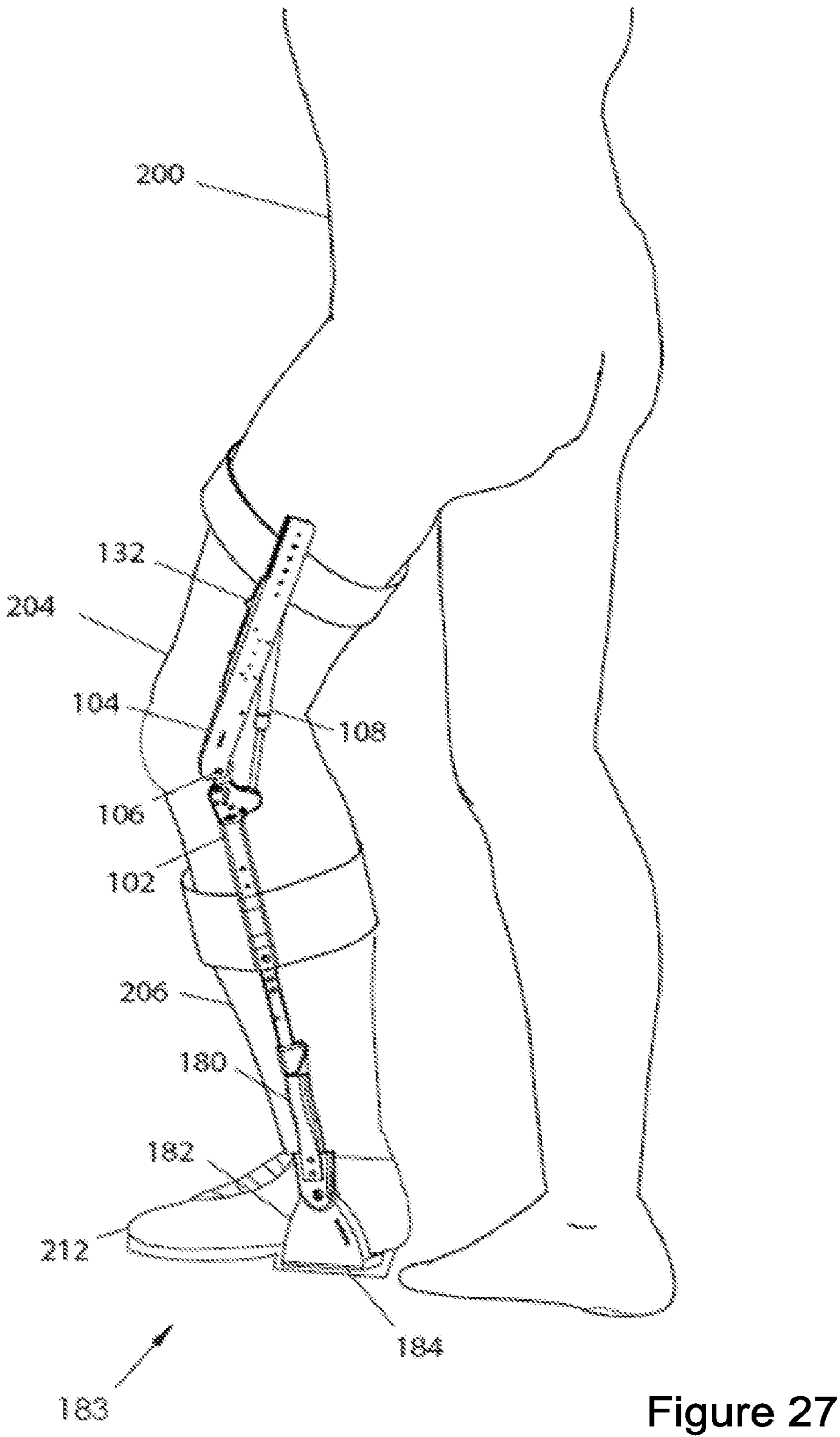
FIG. 27 shows an embodiment where a foot connector is located inside a cavity within the shoe sole.

In some embodiments, exoskeleton leg 100 further includes a foot link mechanism 183. In some embodiments, as shown in FIG. 25, foot link mechanism 183 is connected or coupled to first link 102 when first link 102 is connected or coupled to user's shank 206. Of course in some embodiments, foot link mechanism 183 is connected or coupled to second link 104 when second link 104 is connected or coupled to user's shank 206 (not shown). A person having ordinary skill the art will recognize various mechanisms with various degrees of freedom for foot link mechanism 183. FIG. 25 shows an embodiment of exoskeleton leg 100 that foot link mechanism 183 includes a first ankle link 180 that is coupled to second link 104. The second end of first ankle link 180 is rotatably coupled to a foot connector 182 that is configured to move in unison with the person's foot 214. In some embodiments, as shown in FIG. 25 foot connector 182 is located at the bottom of said user's shoe 212. In some embodiments, as shown in FIG. 26 foot connector 182 is located inside user's shoe 212. The shoe has been removed from the image for clarity. In some embodiments, as shown in FIG. 27, foot connector 182 is located inside cavity 184 within the shoe sole.

Figure 24:
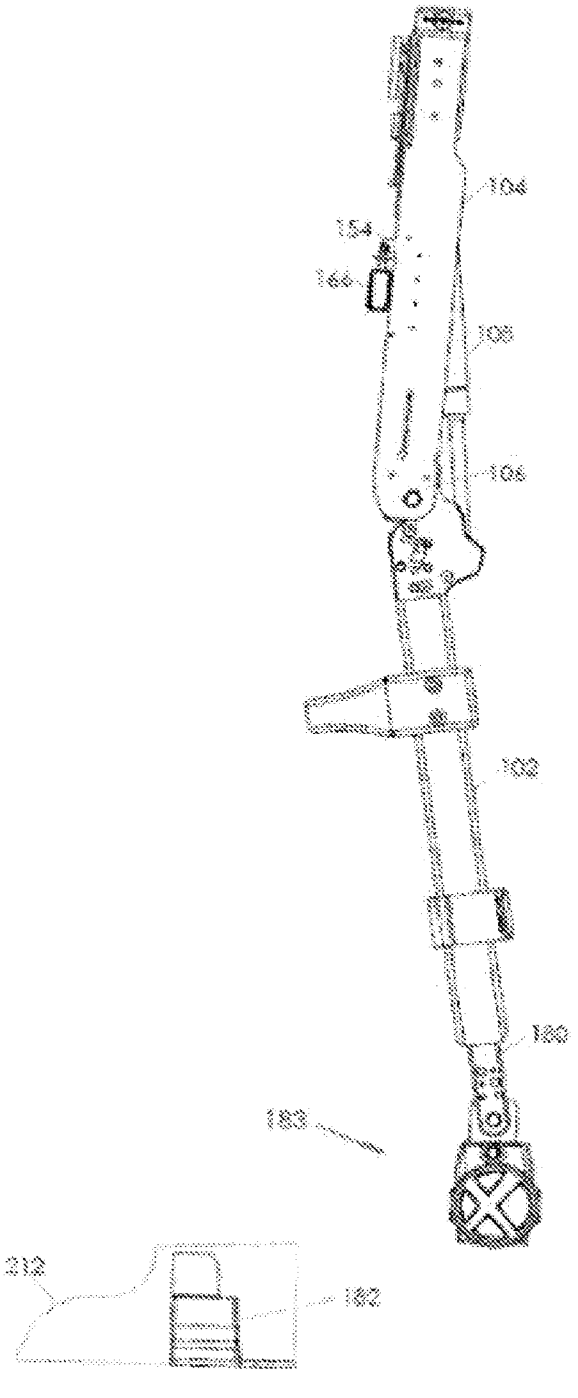
FIG. 24 shows an embodiment where a foot connector can quickly detach from the foot link mechanism.
Figure 29:
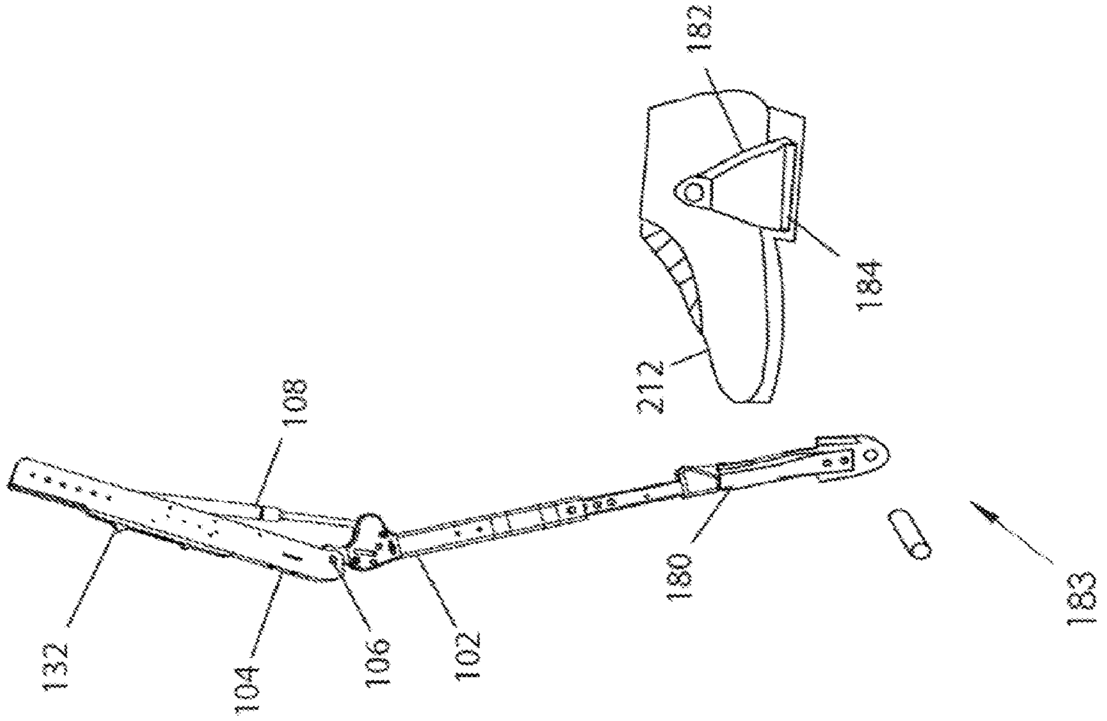
FIG. 29 shows an embodiment where a foot connector can quickly detach from a foot link mechanism.
Figure 28:
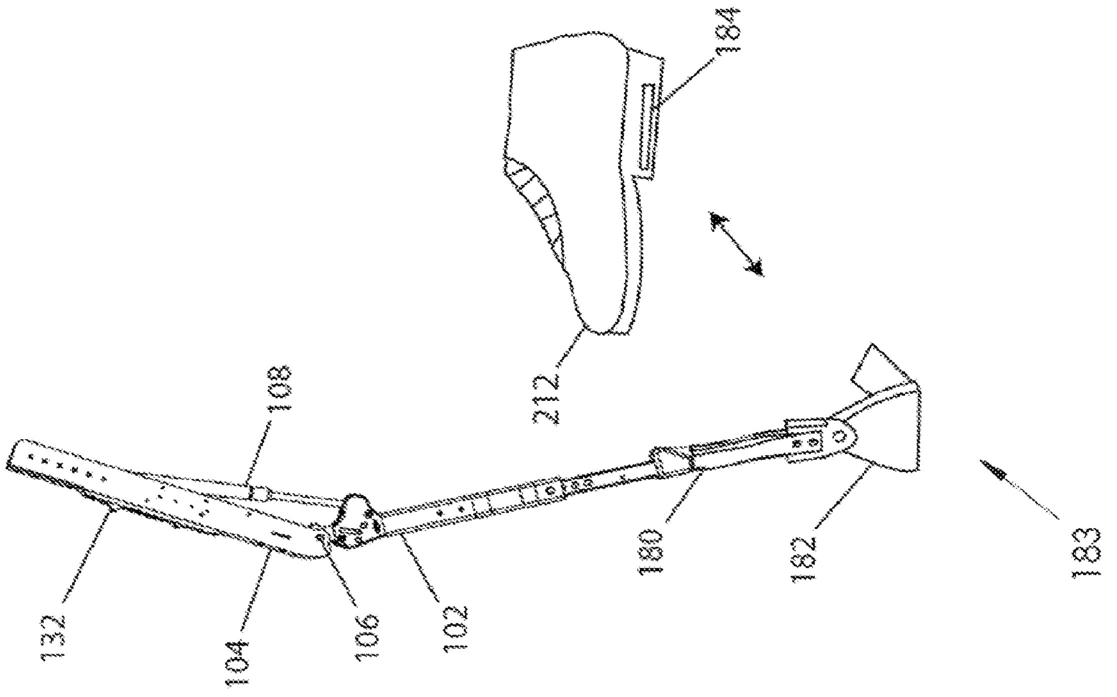
FIG. 28 shows an embodiment where a foot connector can quickly detach from a user's shoe.
Figure 30:
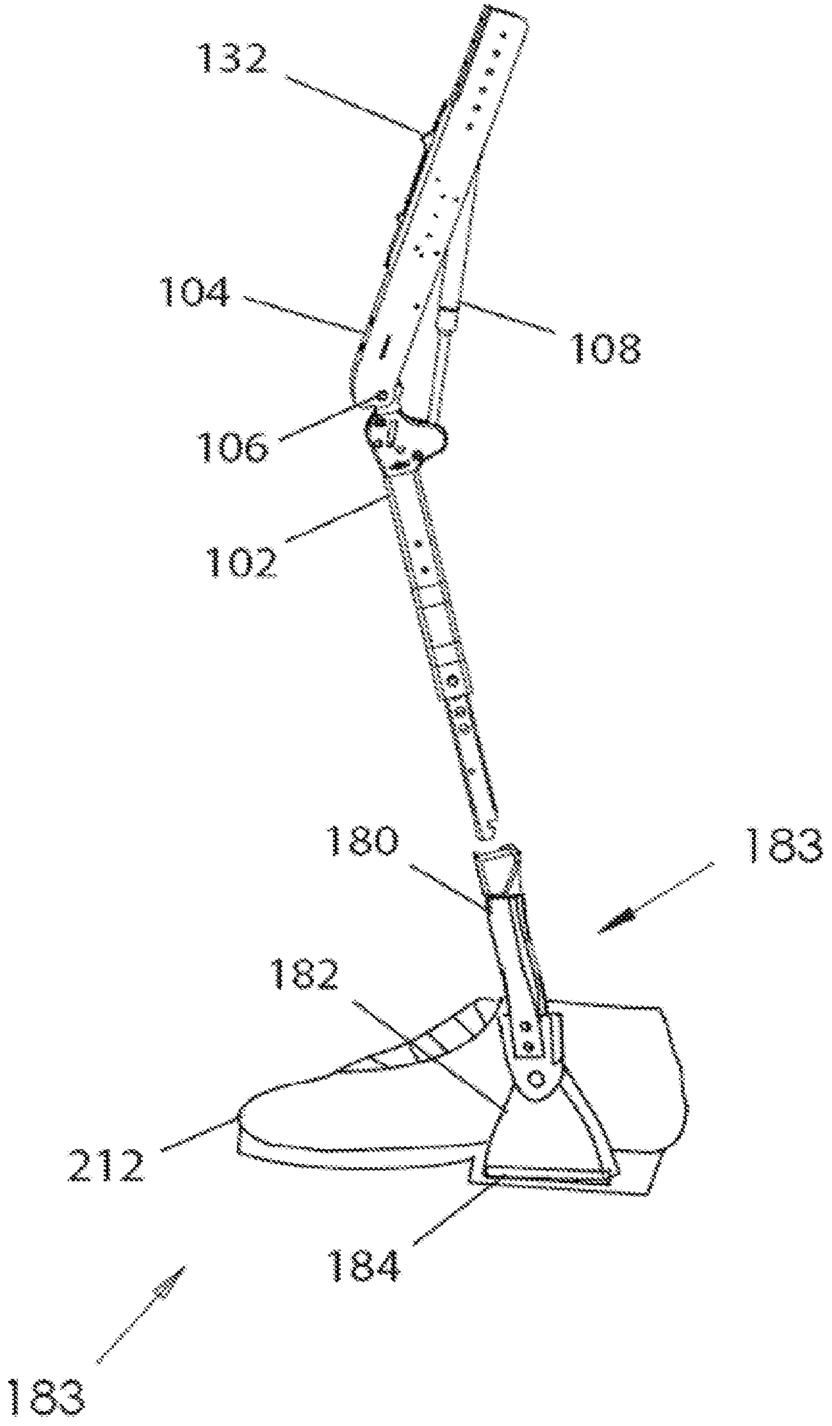
FIG. 30 shows an embodiment where a foot link mechanism can quickly detach from a first link.

As shown in FIG. 28, in some embodiments, foot connector 182 can quickly detach from user's shoe 212. As shown in FIGS. 24 and 29, in some embodiments, foot connector 182 can quickly detach from foot link mechanism 183. As shown in FIG. 30, in some embodiments, foot link mechanism 183 can quickly detach from first link 102. Of course in some embodiments, foot link mechanism 183 can quickly detach from second link 104 when second link 104 is coupled to user's shank 206 (not shown).

Figure 31:
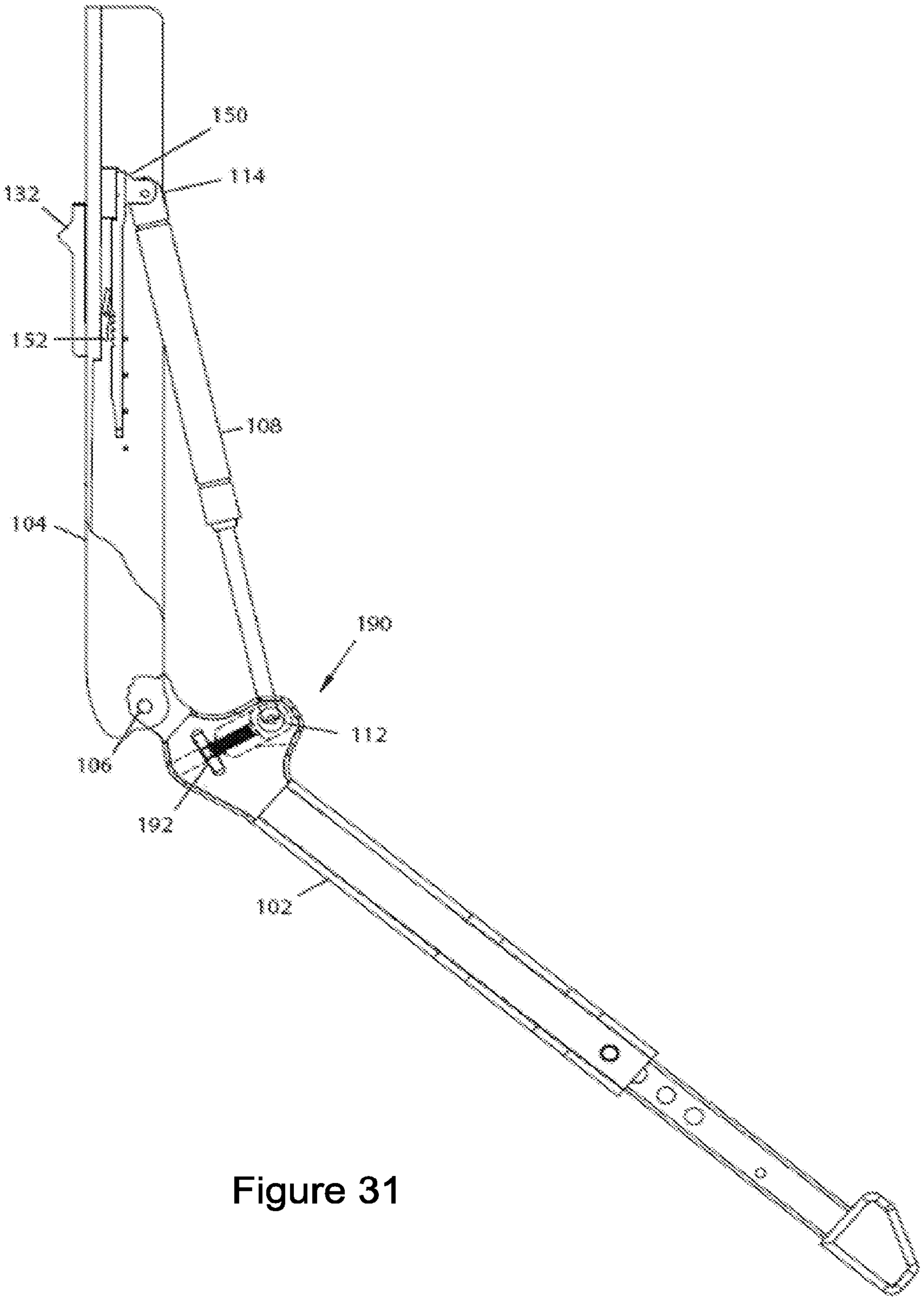
FIG. 31 shows an embodiment where an exoskeleton leg includes a torque adjustment mechanism that can be used to change the supporting torque.

FIG. 31 shows an embodiment of exoskeleton leg 100 that includes a torque adjustment mechanism 190 that can be used to change the supporting torque exoskeleton leg 100 is capable of providing. In this specific embodiment, torque adjustment mechanism 190 comprises of a torque adjustment dial 192 that can be rotated to change the location of first end 112 or second end 114 of force generator 108.

What is claimed is:

1. An exoskeleton leg apparatus, having a first operational mode and a second operational mode two operational modes and configured to be coupled to a leg of a wearer, the exoskeleton leg apparatus comprising:

a first link configured to move in unison with one of a shank and a thigh of the wearer;

a second link, rotatably coupled to the first link and configured to move in unison with another one of the shank and the thigh of the wearer; and a force generator, comprising a first end and a second end, wherein the first end is coupled to one of the first link and the second link, wherein:

during the first operational mode, the second end of the force generator gets latched to another one of the first link and the second link, when the first link and second link flex relative to each other thereby partially supporting a weight of the wearer, and during the second operational mode, the second end of the force generator is not latched to another one of the first link and the second link thereby allowing for unimpeded flexion and extension of the first link and second link relative to each other.

2. The exoskeleton leg apparatus of claim 1, further comprising a constraining mechanism, having at least a first operational mode and a second operational mode, wherein while the constraining mechanism is in the first operational mode, the second end of the force generator gets latched to another one of the first link and the second link, when the first link and second link flex relative to each other thereby partially supporting the wearer's weight, and while the constraining mechanism is in the second operational mode, the second end of the force generator is not latched to another one of the first link and the second link.

3. The exoskeleton leg apparatus of claim 2, further comprising an actuator configured to move the constraining mechanism between the first operational mode and the second operational mode.

4. The exoskeleton leg apparatus of claim 3, further comprising a stance sensor configured to generate a signal indicating the leg of the wearer contacting the ground, said signal initiating the actuator to move the constraining mechanism to the first operational mode.

5. The exoskeleton leg apparatus of claim 3, further comprising:

a stance sensor, configured to generate a signal indicating the leg of the wearer contacting the ground, and a contralateral stance sensor on the contralateral leg configured to generate a signal indicating the contralateral leg of the wearer contacting the ground, wherein the signal from the stance sensor and the signal from the contralateral stance sensor indicate both legs are on the ground and initiate the actuator to move the constraining mechanism to the first operational mode thereby supporting the wearer during squatting.

6. The exoskeleton leg apparatus of claim 3, further comprising two stance sensors configured to generate two signals indicating two legs of the wearer contacting the ground, wherein said signals initiate the actuator to move the constraining mechanism to the first operational mode thereby supporting the wearer during the squatting motion.

7. The exoskeleton leg apparatus of claim 3, wherein the actuator is selected from the group consisting of a solenoid, a linear motor, an electric motor, a servo, a DC motors, a voice coil actuator, a piezoelectric actuator, a spring loaded solenoid, a spring loaded motor, and any combination of these.

8. The exoskeleton leg apparatus of claim 2, further comprising a manual tab having at least a first position and a second position and configured to be operable by the wearer, wherein:

the manual tab moves the constraining mechanism to the first operational mode when the wearer moves the manual tab to the first position, and the manual tab moves the constraining mechanism to the second operational mode when the wearer moves the manual tab to the second position.

9. The exoskeleton leg apparatus of claim 8, wherein the manual tab is configured to slide on one of the first link and the second link between the first position and the second position.

10. The exoskeleton leg apparatus of claim 8, further comprising a magnet, wherein the magnet generates a magnetic force configured to move the constraining mechanism between the first operational mode and the second operational mode.

11. The exoskeleton leg apparatus of claim 2, where the constraining mechanism comprises a pawl, the pawl having at least a first operational position and a second operational position, wherein:

while the pawl is in the first operational position, the second end of the force generator gets latched to the pawl when the first link and the second link flex relative to each other, and while the pawl is in the second operational position, the second end of the force generator is not latched to the pawl, and the first link and the second link are configured to freely flex and extend relative to each other.

12. The exoskeleton leg apparatus of claim 11, wherein the pawl is rotatably coupled to the exoskeleton leg apparatus.

13. The exoskeleton leg apparatus of claim 11, further comprising an actuator configured to move the pawl between a first position and a second position.

14. The exoskeleton leg apparatus of claim 2, wherein the constraining mechanism comprises:

an indentation; and an indentation filler, coupled to another one of the first link and the second link and having at least a first operational position and a second operational position, wherein:

while the indentation filler is in the first operational position, the indentation is not occupied by the indentation filler and the second end of the force generator engages the indentation when the first link and the second link flex relative to each other, and while the indentation filler is in the second operational position, the indentation is occupied by the indentation filler and the second end of the force generator does not engage the indentation and the first link and the second link are free to flex and extend relative to each other.

15. The exoskeleton leg apparatus of claim 14, further comprising an actuator configured to move the indentation filler between a first position and a second position.

16. The exoskeleton leg apparatus of claim 2, wherein the constraining mechanism is configured to be moved by the wearer between the first operational mode and the second operational mode.

17. The exoskeleton leg apparatus of claim 2, wherein the constraining mechanism is in the first operational mode when the leg of the wearer is on a ground.

18. The exoskeleton leg apparatus of claim 1, further comprising an actuator, configured to move the exoskeleton leg apparatus between the two operational modes.

19. The exoskeleton leg apparatus of claim 18, wherein the actuator is selected from the group consisting of a solenoid, a linear motor, an electric motor, a servo, a DC motors, a voice coil actuator, a piezoelectric actuator, a spring loaded solenoid, a spring loaded motor, and any combination of these.

20. The exoskeleton leg apparatus of claim 18, further comprising a stance sensor, configured to generate a signal indicating the leg of the wearer contacting the ground, wherein the signal initiates the actuator to move the exoskeleton leg apparatus to the first operational mode.

21. The exoskeleton leg apparatus of claim 18, further comprising:

a stance sensor configured to generate a signal indicating the leg of the wearer contacting the ground; and a contralateral stance sensor on a contralateral leg configured to generate a signal indicating the contralateral leg of the wearer contacting the ground, wherein the signal from the stance sensor and the signal from the contralateral stance sensor indicate both legs are on the ground and initiate the actuator to move the exoskeleton leg apparatus to the first operational mode thereby supporting the wearer during squatting.

22. The exoskeleton leg apparatus of claim 18, further comprising two stance sensors configured to generate two signals indicating that both the leg and the contralateral leg of the wearer are contacting the ground, wherein the two signals initiate the actuator to move the exoskeleton leg apparatus to the first operational mode, thereby supporting the wearer during the squatting motion.

23. The exoskeleton leg apparatus of claim 1 further comprising a torque adjustment mechanism to change the supporting torque of the force generator.

24. The exoskeleton leg apparatus of claim 23, wherein the torque adjustment mechanism is configured to change a location of the first end or the second end of the force generator.

25. The exoskeleton leg apparatus of claim 1, further comprising a foot link mechanism coupled to one of the first link and the second link, the foot link mechanism being configured to rest under the foot of the wearer and comprising a foot connector configured to move in unison with the foot of the wearer.

26. The exoskeleton leg apparatus of claim 25, wherein the foot connector is coupled to shoes of the wearer.

27. The exoskeleton leg apparatus of claim 1, wherein the force generator is selected from the group consisting of a gas spring, a compression spring, a coil spring, a leaf spring, an air spring, a tensile spring, and a combination thereof.

28. The exoskeleton leg apparatus of claim 1, wherein the exoskeleton leg apparatus is in the first operational mode when the leg of the wearer is on a ground.

29. The exoskeleton leg apparatus of claim 1, wherein, when both the leg and a contralateral leg of the wearer are on a ground, the exoskeleton leg apparatus is in the first operational mode thereby supporting the wearer during squatting.

30. The exoskeleton leg apparatus of claim 1, wherein the second end of the force generator is configured to latch to another one of the first link and the second link by the wearer.

* * * * *